(12) United States Patent  
Paukshto et al.

(10) Patent No.: US 7,084,939 B2  
(45) Date of Patent: Aug. 1, 2006

(54) NORMALLY WHITE, SUPERTWIST NEMATIC LIQUID CRYSTAL DISPLAY OF REFLECTIVE TYPE

(75) Inventors: Michael V. Paukshto, Foster City, CA (US); Serguei Palto, Moscow (RU)

(73) Assignee: Nitto Denko Corporation, Osaka (JP)

( * ) Notice: Subject to any disclaimer, the term of this patent is extended or adjusted under 35 U.S.C. 154(b) by 94 days.

(21) Appl. No.: 10/638,205

(22) Filed: Aug. 7, 2003

(65) Prior Publication Data

US 2004/0085508 A1    May 6, 2004

Related U.S. Application Data

(63) Continuation-in-part of application No. 10/272,833, filed on Oct. 16, 2002, now abandoned.

(51) Int. Cl.
*G02F 1/1335* (2006.01)

(52) U.S. Cl. .......................... 349/101; 349/96; 349/113; 349/117; 349/177; 349/179; 349/180; 349/181

(58) Field of Classification Search ................. 349/113, 349/101, 96, 117, 177, 179–181  
See application file for complete search history.

(56) References Cited

U.S. PATENT DOCUMENTS

| | | | |
|---|---|---|---|
| 3,784,280 A | 1/1974 | Bigelow | |
| 3,837,729 A | 9/1974 | Harsch | |
| 4,701,028 A | 10/1987 | Clerc et al. | |
| 5,139,340 A * | 8/1992 | Okumura | ..................... 349/99 |
| 5,619,356 A | 4/1997 | Kozo et al. | |
| 5,739,296 A | 4/1998 | Gvon et al. | |
| 5,926,245 A | 7/1999 | Kwok et al. | |
| 6,049,428 A | 4/2000 | Khan et al. | |
| 6,091,477 A | 7/2000 | Kwok et al. | |
| 6,108,064 A * | 8/2000 | Minoura et al. | ............ 349/130 |

(Continued)

FOREIGN PATENT DOCUMENTS

EP    0 431 952 A2    6/1991

(Continued)

OTHER PUBLICATIONS

P.G. De Gennes, J. Prost, "The Physics of Liquid Crystals", Oxford University Presss, Walton Street, Oxford OX2 6DP, 20 pages.

(Continued)

*Primary Examiner*—Toan Ton  
*Assistant Examiner*—George Y. Wang  
(74) *Attorney, Agent, or Firm*—Dorsey & Whitney LLP

(57) ABSTRACT

A normally white supertwist nematic liquid crystal display of reflective type is provided. This display comprises a reflector, a layer of chiral nematic liquid crystal having a front aligning surface facing a light source and a rear aligning surface facing the reflector, and a front polarizer. The nematic liquid crystal has an optical retardation ($\Delta nd$) of the layer and a distribution of directors, wherein the chiral nematic liquid crystal has a twist angle ($\Phi$) between an alignment direction of the director at the front aligning surface and an alignment direction of the director at the rear aligning surface. The front polarizer is disposed between the layer of chiral nematic liquid crystal and the light source. The front polarizer has a transmission axis forming an angle ($\alpha$) with the alignment direction of the director at the front aligning surface of the chiral nematic liquid crystal layer. The optical retardation ($\Delta nd$) and the angle ($\alpha$) are defined by the following formulas:

$$\alpha((\Phi))=\text{sign}(\Phi)\cdot(47.0-0.4936|\Phi|+2.6786\times10^{-3}\cdot\Phi^2)\pm5, \text{deg, and}$$

$$\Delta nd(\Phi)=-11.674+0.1915\cdot|\Phi|-9.8393\times10^{-4}\cdot\Phi^2 1.6667\times 10^{-6}\cdot|\Phi|^3\pm0.05, \mu m.$$

9 Claims, 24 Drawing Sheets

U.S. PATENT DOCUMENTS

| | | |
|---|---|---|
| 6,341,001 B1 | 1/2002 | Kwok |
| 2001/0029638 A1 | 10/2001 | Bobrov et al. |
| 2002/0047957 A1 | 4/2002 | Venema |

FOREIGN PATENT DOCUMENTS

| | | |
|---|---|---|
| EP | 0 377 757 B1 | 1/1997 |
| EP | 0 576 303 B1 | 10/1998 |
| EP | 0 1 111 437 A1 | 6/2001 |
| EP | 0 985 953 A3 | 8/2001 |
| FR | 2 580 105 A1 | 4/1985 |
| WO | WO 01/0063346 A1 | 8/2001 |

OTHER PUBLICATIONS

Dwight W. Berreman, "Optics in Stratified and Anisotropic Media: 4×4-Matrix Formulation", Journal of the Optical Society of American, vol. 62, No. 4, Apr. 1972, pp. 502-510.

S.P. Palto, "An Algorithm for Solving the Optical Problem for Stratified Anisotropic Media", Journal of Experimental and theoretical Physics, vol. 92, No. 4, 2001, pp. 552-560.

Bobrov, Y., "*Spectral Properties of Thin Crystal Film Polarizers*", Optics of Thin Crystal Film Polarizers, Molecular Materials, vol. 14, (2001), pp. 191-203.

Kwok, H.S., "*Parameter Space Representation of Liquid Crystal Display Operating Modes*", American Institute of Physics, Journal of Appl. Phys., vol. 80, No. 7, (Oct. 1996), pp. 3687-3693.

Lazarev, P., et al., "*X-Ray Diffraction by Large Area Organic Crystalline Nano-Films*", Molecular Materials, vol. 14, (2001), pp. 303-311.

Silverstein, Louis D. et al., "*19.3: Thin Crystal Films (TCF) for LCD Color Correction*", SID 00 DIGEST, (2000), pp. 1-5.

Tsukada, Toshihisa, "*Chapter 1: Overview of Reflective Display*", Sec. 2.4, "*Reflectors*", TFT/LCD Liquid-Crystal Displays Addressed by Thin-Film Transistors, Gordon and Breach Science Publishers, BOOK, pp. 9-12.

Tsukada, Toshihisa, "*Chapter 4: Twisted Nematic Cells*", Sec. 4, "*Reflector TN Cells*", TFT/LCD Liquid-Crystal Displays Addressed by Thin-Film Transistors, Gordon and Breach Science Publishers, BOOK, pp. 108-112.

Tsukada, Toshihisa, "*Chapter 5: Super-Twisted Nematic Displays*", TFT/LCD Liquid-Crystal Displays Addressed by Thin-Film Transistors, Gordon and Breach Science Publishers, BOOK, pp. 113-123.

Wu, Shin-Tson et al., "*Reflective Liquid Crystal Displays*", John Wiley & Sons, Ltd., BOOK, pp. 1-188, (not included).

Chen, Jun et al., "Reflective Supertwisted Nematic Liquid Crystal Displays", Jpn. Journal of Applied Physics, vol. 37, (1998), pp. 217-223. (XP-002287342).

Lazarev, P., et al., "*X-Ray Diffraction by Large Area Organic Crystalline Nano-Films*", Molecular Materials, vol. 14, (2001), pp. 303-311. (XP-002287373).

Luder, Ernst, *Liquid Crystal Materials and Liquid Crystal Cells*, Wiley-Sid, Chippenham, (2000) pp. 16, 70. (XP002287343).

Yu, F.H., et al., "*Reflective Twisted Nematic Liquid Crystal Displays*" Section II. Elimination of Retardation Film and Rear Polarizer, American Institute of Physics, Journey of Applied Physics, vol. 82, Section 11, (Dec. 1997), pp. 5287-5294. (XP-000752426).

\* cited by examiner (a)

(b)

(a)

(b)

(a)

(b)

(a)

(b)

(a)

(b)

NORMALLY WHITE, SUPERTWIST NEMATIC LIQUID CRYSTAL DISPLAY OF REFLECTIVE TYPE

CROSS-REFERENCES TO RELATED APPLICATIONS

This application is a continuation-in-part of U.S. patent application Ser. No. 10/272,833, filed Oct. 16, 2002, now abandoned the entire disclosure of which is hereby incorporated by reference.

BACKGROUND

The present invention relates in general to liquid crystal displays (LCDs), and in particular to normally white, supertwist nematic liquid crystal displays of reflective type.

Reflective liquid crystal displays are widely used in mobile systems, since they feature very low energy consumption, small size, low weight, and are convenient for use outdoors. Reflective displays with a single polarizer have good potential for reaching high brightness, enhanced contrast ratio and low energy consumption.

Supertwist nematic liquid crystal displays (STN displays) of reflective type with single polarizer possess potentially high brightness and good color rendition capacity. STN displays are characterized by large twist angles of nematic liquid crystal (LC) directors (approximately from 180° to 260°) as compared to regular twist nematic liquid crystal displays (TN displays). STN displays provide voltage-contrast characteristics with sharp cutoff, which are required to obtain high multiplexing ability and contrast ratios. STN displays feature extraordinarily high resolution ability and small pixel size, which enhance information capacity of such displays in displaying numerical (symbolic) information as well as in displaying images, for example photographs. Consequently, STN displays feature excellent image quality, as compared to regular passive-matrix TN-displays. These advantages are especially pronounced in large displays with high multiplexing level. STN displays cost low, require low operating voltage and feature low energy consumption.

A normally white, supertwist nematic liquid crystal display of reflective type is described in "TFT/LCD Liquid-Crystal Displays Addressed by Thin-Film Transistors" by Toshihisa Tsukada, Vol. 29, Gordon and Breach Science Publishers, p. 153. The known STN-display contains a layer of nematic liquid crystal. The dependences of the voltage-contrast characteristic on the LC director twist angle in the range from 210 to 330° are presented. It has been shown that the dependence of the contrast ratio on the applied control voltage is sensitive at the twist angle of 240°. However, the optimum direction of the transmission axis of the polarizer and the optimum values of the product dΔn of the nematic layer thickness (d) and the difference of the refraction indexes (optical anisotropy) Δn, which provide maximum values of the contrast ratio and brightness, have not been determined.

A known normally white, supertwist nematic liquid crystal display of reflective type is described by Shin-Tson Wu, Deng-Ke Yang, "Reflective Liquid Crystal Displays", John Wiley & Sons, Ltd., p. 9. This known STN display consists of a glass plate, which is coated with a layer of aluminum to create a reflecting surface (mirror), and a layer of nematic liquid crystal, above which there is a second glass plate. Polarizing and scattering layers are formed on the second glass plate. One of the drawbacks of this known STN display is that the optimum direction of the optical transmission axis of the polarizer, which provides maximum contrast of the display, is not known.

A known twist nematic liquid crystal reflective display comprising a liquid crystal and two polarizers with an LC director twist angle of 45° is described by S. -T. Wu, D. -K. Yang, Reflective Liquid Crystal Displays, 2001 by John Willey & Sons Ltd, p. 108. This design requires two polarizers, one of which is placed between the liquid crystal and the mirror. The drawback of this design is image parallax, which prohibits the display from being used in applications that require high resolution. Since a second polarizer is necessary, the design cannot be simplified by combining the functions of a mirror and an electrode in a single element. Such display has relatively low brightness and small viewing angle and contrast, etc.

A possible design of twist nematic liquid crystal reflective display comprises a liquid crystal between two electrodes, a phase compensator and one polarizer. One of the two electrodes in this design is transparent, while the second electrode has good reflective ability and functions as a mirror at the same time. The phase compensator (or compensator) represents a phase shifting plate, which provides a phase delay of $\pi/2$. The compensator eliminates the need for a second polarizer. Due to dual birefringence in the absence of the second polarizer, the light becomes elliptically polarized after it travels twice through the liquid crystal. Therefore, the compensator changes the elliptical polarization to linear, which provides image contrast. The drawback of this design is that it is impossible to precisely transform elliptical polarization into linear polarization for all wavelengths at any selected operating voltage across the liquid crystal.

This drawback manifests itself in relatively low image contrast. Another drawback of this design is the inclusion of the compensator, which complicates the design of the display.

Another twist nematic liquid crystal reflective display comprises a liquid crystal, two electrodes, a phase compensator and a single polarizer. The design of this display suggests using a phase compensator to obtain high quality image without parallax. The phase compensator can essentially be any material suitable for use in displays and featuring birefringence. The phase compensator installed between the polarizer and liquid crystal allows making the second electrode reflective, thereby simplifying the design. The design requires selection of special parameters of the liquid crystal and compensator according to conditions that are difficult to satisfy in the entire visible region of the spectrum. This manifests itself in the following drawbacks of the design. First, either distortions of color rendition are possible, or using different voltage for the blue, red or green colors may result in a more complex design of display. Second, since the phase compensator and the liquid crystal have to have weak dispersion, optical parameters of which are interrelated, material selection for the design is hindered.

There is a twist nematic liquid crystal reflective display comprising a front polarizer, a phase compensator and a liquid crystal. In order to increase the contrast and brightness of the image, the following parameters are selected: the angle between the transmission axis of the polarizer and the alignment direction of the LC director on the front surface of the liquid crystal, the optical anisotropy of the liquid crystal and the phase compensator, as well as the twist angle of the liquid crystal.

The drawback of above mentioned displays using a phase compensator plate is that the image is very sensitive to the thickness of the liquid crystal and the phase compensator, i.e., sensitive to the precision of fabrication. Besides, correction of image distortions related to fabrication tolerances complicates the design and imposes special requirements to the properties of the liquid crystal.

Another twist nematic liquid crystal reflective display comprises a single polarizer and does not contain the phase compensator. To obtain the best brightness, contrast and color rendition, this design suggests using optimized values of the LC director twist angle, the angle between the optical axis of the polarizer and the alignment direction of the director at the surface of LC closest to the polarizer, and the optical path difference between the ordinary and extraordinary rays in the liquid crystal. The drawback of this design is the uncertainty of the mentioned parameters, which complicates the optimization.

Another twist nematic liquid crystal reflective display can comprise a polarizer and liquid crystal. To obtain the best brightness, contrast and color rendition, and low sensitivity to the variations of thickness of the liquid crystal cell, this design suggests optimization of the LC director twist angle, the angle between the optical transmission axis of the polarizer and the alignment direction of the director of LC on the surface closest to the polarizer, and the optical anisotropy of the liquid crystal. One of the drawbacks of the display is, first, the high sensitivity to a voltage level of a switched off condition, i.e., the voltage which defines transmission state of the display. It also does not maintain the achromaticity when it transits from the "black" state to the "white" state. Moreover, the level of contrast and brightness is insufficient.

Another display uses the angle between the transmission axis of the polarizer and the orientation of LC directors as another parameter of optimization. This parameter is varied to obtain high contrast, brightness and achromaticity, in addition to the twist angle of the liquid crystal and the optical path difference. Optimization is performed with the specially designed mathematical method (H. S. Kwok, Parameter space representation of liquid crystal display operating modes, J. Appl. Phys. 80 (7), p. 3687, 1996). The drawback of this display is, first, the wide range of optical path differences proposed by the authors. This display suffers from poor stability within the region of the suggested angles. In other words, the proposed solution does not take into account the high sensitivity of the mixed regime of operation of the liquid crystal to the precision of fabrication of displays. Another drawback is the non-standard values of the twist angles. The small values of twist angles do not provide multiplexing ability of the display.

Another known normally white, supertwist nematic liquid crystal display of reflective type comprises a reflector, a single polarizer and a special retarder, twist-retarder (TR). The drawback of this display is that the display contains a retarder layer, and that the optimum orientations of the optical transmission axis of the polarizer which provide the maximum contrast of the display are not known. The presence of the retarder in the display results in additional losses of light transmission, complicates the design of the display, increases its size, and raises the manufacturing cost of the display.

There is a method of fabrication of the twist nematic liquid crystal reflective display with optimized LC director twist angle and its optical anisotropy. Despite the author's claims of generalized displays with a single polarizer, these displays are not truly single polarizer displays. The beam splitter used in the display in fact plays the role of two polarizers. This is because the polarizing beam splitter transmits one polarization state, but reflects the orthogonal one. Thus, if a sheet polarizer is used, it is necessary to use additional retarders to obtain a black appearance in ON state (or OFF state for normally-black operation mode). The use of the retarder complicates the design and makes additional problems when internal polarizers made of a thin crystalline film (TCF) are used. Another disadvantage is the fact that the author assumes the "black" state (or "bright" state for normally-black mode) corresponding to the homeotropic distribution of the LC director. It is not the case for STN designs, where to obtain high multiplexing ability the black state does not correspond to the truly homeotropic distribution of the LC director, because it may lead to high voltage difference between OFF and ON states, which is incompatible with a high multiplexing level. To make a real optimization, it is necessary to solve not only the optical problem, but also the problem of in-field behavior of the LC director.

SUMMARY AND OBJECTS OF THE INVENTION

Accordingly, one of the objectives of the present invention is to overcome the aforementioned drawbacks of known STN displays such as large losses of light transmission upon passing through the multilayer structure of the display, complexity of design, large display thickness, low contrast ratio and multiplexing ability, and low brightness.

These and other objectives are achieved by the normally white supertwist nematic liquid crystal display of the present invention. The display comprises a reflector, a layer of chiral nematic liquid crystal having a front aligning surface facing a light source and a rear aligning surface facing the reflector, and a front polarizer. The nematic liquid crystal has an optical retardation ($\Delta nd$) of the layer and a distribution of directors, wherein there is a twist angle ($\Phi$) between an alignment direction of the director at the front aligning surface and an alignment direction of director at the rear aligning surface. The front polarizer is disposed between the layer of the chiral nematic liquid crystal and the light source. The front polarizer has a transmission axis forming an angle ($\alpha$) with the alignment direction of the director at the front aligning surface of the chiral nematic liquid crystal layer. The optical retardation ($\Delta nd$) and the angle ($\alpha$) are defined by the following formulas:

$$\alpha(\Phi) = \text{sign}(\Phi) \cdot (47.0 - 0.4936|\Phi| + 2.6786 \times 10^{-3} \cdot \Phi^2) \pm 5, \text{ deg, and}$$

$$\Delta nd(\Phi) = -11.674 + 0.1915 \cdot |\Phi| - 9.8393 \times 10^{-4} \cdot \Phi^2 + 1.6667 \times 10^{-6} \cdot |\Phi|^3 \pm 0.05, \mu m.$$

BRIEF DESCRIPTION OF THE DRAWINGS

The foregoing objects and advantages of the invention will be more clearly understood from the following description when read in conjunction with the accompanying drawings in which.

DETAIL DESCRIPTION OF THE INVENTION

As used herein, the term "front" when used to describe glass layer, electrode, protective layer, polarizer, alignment layer, transmission axes and alignment directions means that the described element is located on the viewer side of the chiral nematic liquid crystal (CNLC) and faced to a light source.

As used herein, the term "rear" when used to describe glass layer, electrode, protective layer, alignment layer, transmission axes and alignment directions means that the described element is located on side of the liquid crystal opposite to the viewer and faced to a reflector.

Under Liquid Crystal Display (LCD) here and below we understand either a liquid crystal display or its part in the device.

Figure 1A:
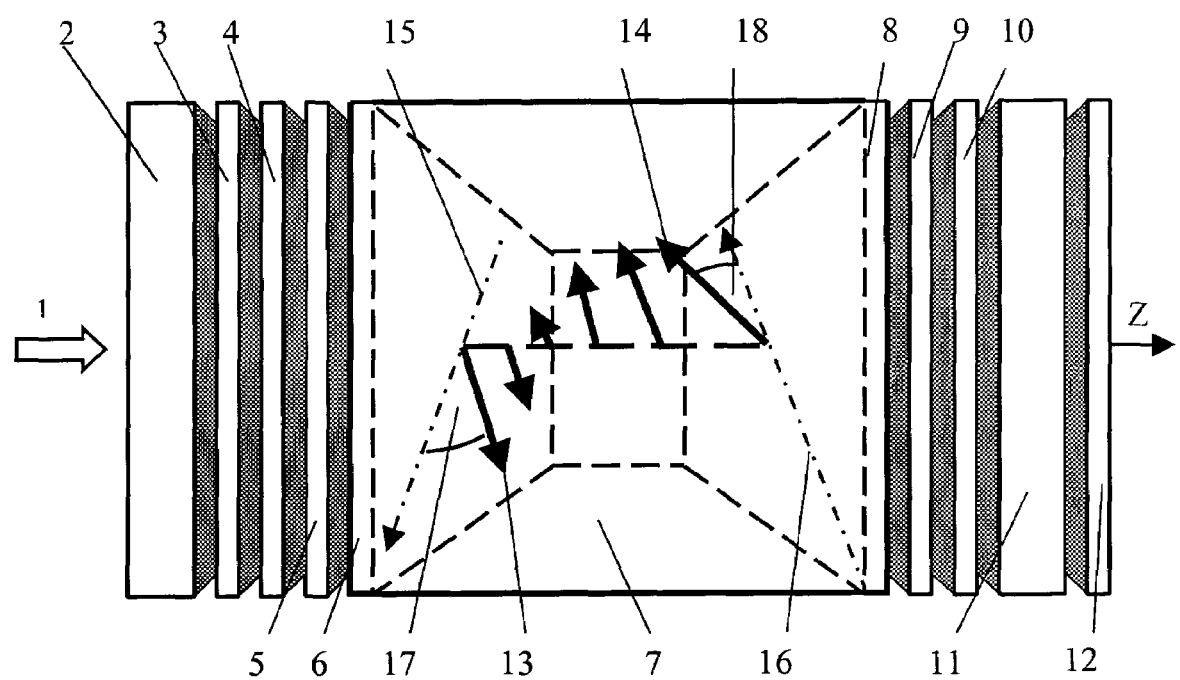
FIG. 1a is a schematic illustrating an embodiment of the present invention.

As shown in FIG. 1a, an embodiment of this invention comprises a light source 1, a front glass plate 2, a front optically transparent electrode 3, a front optically transparent protective layer 4, front polarizer 5, a front alignment PI-layers 6, a chiral nematic liquid crystal (CNLC) layer 7, a rear alignment PI-layers 8, a rear optically transparent protective layer 9, a rear optically transparent electrode 10, a rear glass plate 11, and reflector 12 which has a reflection coefficient no less than 95%.

A unit vector-director characterizes the orientation of a CNLC in each point. The CNLC is oriented by front (facing a light source) and a rear (facing the reflector) aligning surface, which define the boundary condition to produce a distribution of directors. This distribution of directors has a director 13 at the front surface of the CNLC and a director 14 at the rear surface of the CNLC. A projection of the director 13 at the front surface onto the front aligning surface of the CNLC layer determines an alignment direction of the director at the front CNLC surface (front easy axis) 15. A projection of the director 14 at the rear surface onto the rear aligning surface of the CNLC layer determines an alignment direction of the director at the rear CNLC surface (rear easy axis) 16.

A pre-tilt angle 17—the angle between the direction of the director at the front surface and a projection of this director onto the front aligning surface—is one of the angles that characterize a direction of the director 13 at the front surface of CNLC layer. A pre-tilt angle 18—the angle between the direction of the director at the rear surface and a projection of this director onto the rear aligning surface—is one of angles that characterizes a direction of a director 14 at a rear surface of CNLC layer. The present invention provides a normally white, supertwist nematic liquid crystal display (LCD) of reflective type. This display comprises a reflector, a layer of chiral nematic liquid crystal having a front aligning surface facing a light source and a rear aligning surface facing the reflector, and a front polarizer. The nematic liquid crystal has an optical retardation (Δnd) of the layer and a distribution of directors, wherein the chiral nematic liquid crystal has a twist angle (Φ) between an alignment direction of the director at the front aligning surface and an alignment direction of the director at the rear aligning surface. The front polarizer is disposed between the layer of chiral nematic liquid crystal and the light source. The front polarizer has a transmission axis forming an angle (α) with the alignment direction of the director at the front aligning surface of the chiral nematic liquid crystal layer. The optical retardation (Δnd) and the angle (α) are defined by the following formulas:

$$\alpha(\Phi) = \text{sign}(\Phi) \cdot (47.0 - 0.4936|\Phi| + 2.6786 \times 10^{-3} \cdot \Phi^2) \pm 5, \text{ deg, and}$$

$$\Delta nd(\Phi) = -11.674 + 0.1915.1 \cdot |\Phi| 9.8393 \times 10^{-4} \Phi^2 + 1.6667 \times 10^{-6} \cdot |\Phi|^3 \pm 0.05, \mu m.$$

In one embodiment of the invention the twist angle ($\Phi$) is in the range of approximately 180 to 260 degree. In another embodiment of the invention the chiral nematic liquid crystal (CNLC) is further characterized by a helix natural pitch (P) having a value of approximately 360° d/$\Phi$, wherein (d) is a thickness of the liquid crystal layer. In another embodiment of the invention the liquid crystal director at the front surface coincides with a pretilt angle.

The disclosed display does not require retarders and can function with a single polarizer, which simplifies the display structure, reduces the display thickness, reduces light losses, increases the viewing angle, and reduces manufacturing costs. The contrast ratio of the display is enhanced by selecting desirable orientation of the optical transmission axis of the front polarizer, as well as the product (Δnd) of the thickness of the CNLC layer (d) and the optical anisotropy (Δn).

The above improvements provided by the disclosed display are achieved by specially selecting the physical parameters of the layers in the display such as the thickness, the orientation of the optical transmission axis of the front polarizer, and the optical anisotropy of the CNLC. In other words, the technical result is achieved by desirable selection of both geometrical and optical layer parameters of the display.

Parameters such as elastic constants and low frequency dielectric anisotropy ($\Delta\epsilon$) determine the threshold voltage ($V_{thres}$) and the switching time of the LC cell from one operating state to the other. The threshold voltage ($V_{thres}$) does not depend on the refraction indexes of the CNLC. Switching from one state of the CNLC to another is a low frequency process. Thus, the listed parameters determine the operating regime of the display rather than the optical features of the display and do not affect the disclosed technical results.

The ratio of the operating voltages $V_{dark}$ to $V_{bright}$ may be determined by the choice of liquid crystal according to the required multiplexing ability, i.e., $V_{ON}$ and $V_{OFF}$ are parameters of the operating regime of the display and do not depend on the optical characteristics of the layers in the display.

Manufacturing parameters include the thickness of the substrates such as glass plates, the thickness of the optically transparent electrodes such as ITO, the thickness of the protective layer such as silicon dioxide, and the thickness of the alignment layer such as polyimide. The thickness of the above layers may be chosen according to their functional purpose.

The thickness of the glass plates desirably provides structural rigidity and protection for other layers in the display from external effects. Typically, the thickness of the glass plates is 0.7 mm (refraction index n=1.5).

The thickness of the optically transparent electrodes desirably provides low electrical resistance and possibility of application of voltage to it. Typically, the thickness of this layer is 0.03 μm (refraction index n=1.85).

The thickness of the protective layer such as silicon dioxide desirably provides additional protection for the STN-cell from electrical break down. Typically, the thickness of this layer is 60 nm–100 nm (refraction index n=1.57).

The thickness of the alignment layer such as polyimide (PI) is desirably sufficient to provide alignment of the liquid crystal. Typically, the thickness for polyimide layer such as SE3210 Nissan (refraction index n=1.68) is 60 nm.

The thicknesses of all layers listed above are chosen such as to ensure fulfillment of their functional purpose. Therefore, these parameters may be fixed within the interval of their allowable values.

Additional parameters may also be predetermined.

The twist angle ($\Phi$) of the optical axis of the CNLC director can be of different values. For example, the twist angle can be one of the following values: ±180, ±200, ±220, ±240, and ±260°. The twist angle is fixed for a specific STN LCD and chosen such to provide good multiplexing ability of the display and sensitivity of the reflection coefficient to the control voltage.

The pretilt angle of the CNLC director at the interface with the alignment layer is a fixed value, which is determined by the alignment material (in the case of the polyimide, the pretilt angle is about 4°) and possibly by the type of liquid crystal material.

The concentration of chiral dopant is determined by the twist angle of the CNLC director and the thickness of the liquid crystal layer, and therefore derived from the optimization of display design.

Thus, two components in the display structure are important from the standpoint of achieving the disclosed technical results. They are the layer of the front polarizer made of a thin film crystalline material, which is characterized by the orientation of its optical transmission axis and its thickness, and the layer of CNLC, which is characterized by the product (dΔn) of the CNLC layer thickness (d) and the optical anisotropy (Δn). The thickness of the CNLC layer (d) may be selected according to different criteria. Thus, if high speed of operation of the display is required, the CNLC layer should be relatively thin, since the switching time of the display decreases proportionally to the square of the liquid crystal layer thickness (d). If the thickness (d) is chosen out of the condition of manufacturability and reproducibility of the CNLC layer, then it is typically within the interval of approximately 3–6 μm.

Figure 1B:
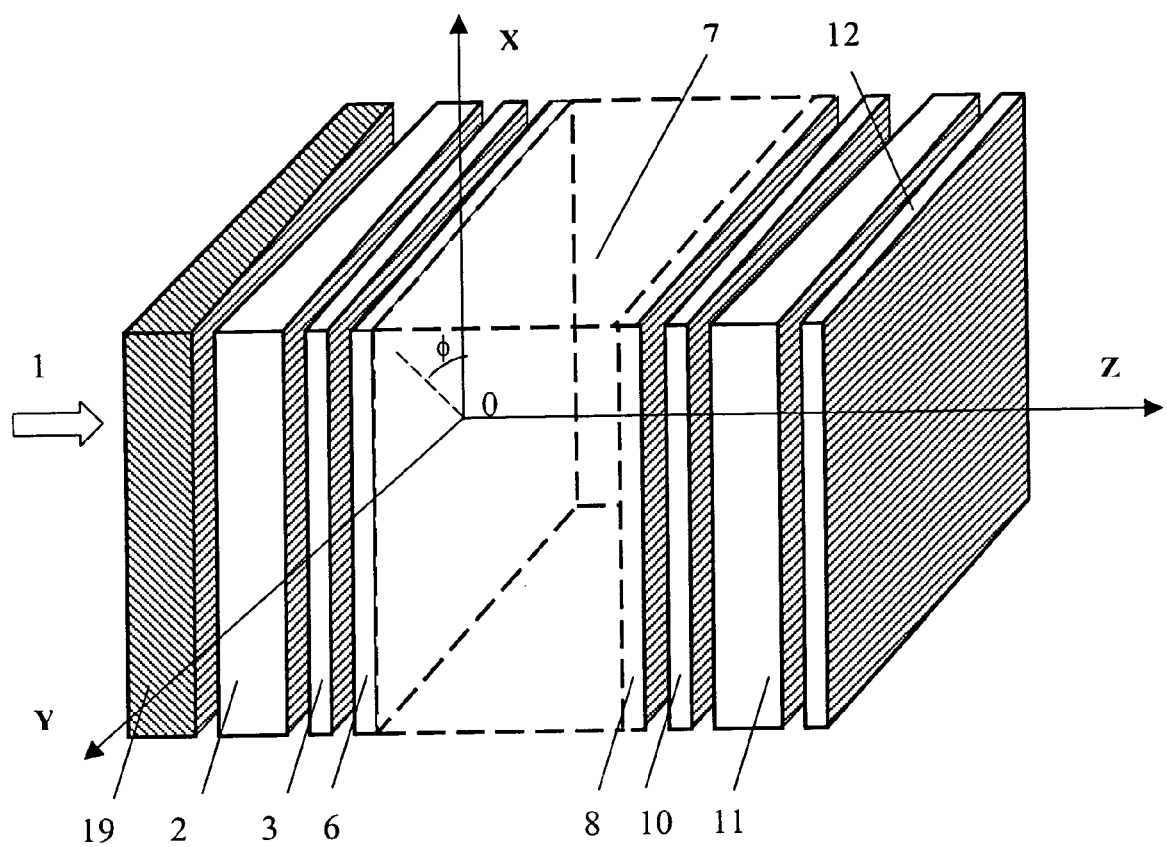
FIG. 1b is a schematic illustrating a simulated design including a light source, a standard O-type polarizer, ITO layers, a chiral nematic liquid crystal layer, alignment layers and a mirror.
Figure 2:
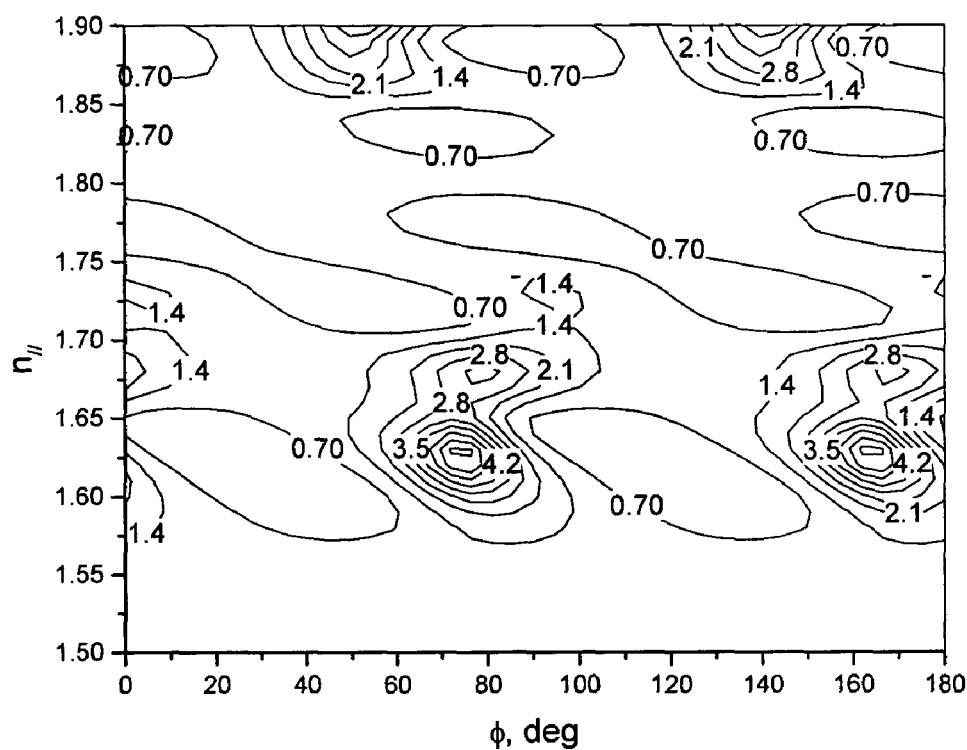
FIGS. 2a and 2b are the optimization maps for 180° STN with a single front polarizer ($\lambda$=550 nm) for the left-handed twist with a front easy axis at +120° (FIG. 2a) and for the right-handed twist with a rear easy axis at +120° (FIG. 2b).
Figure 2:
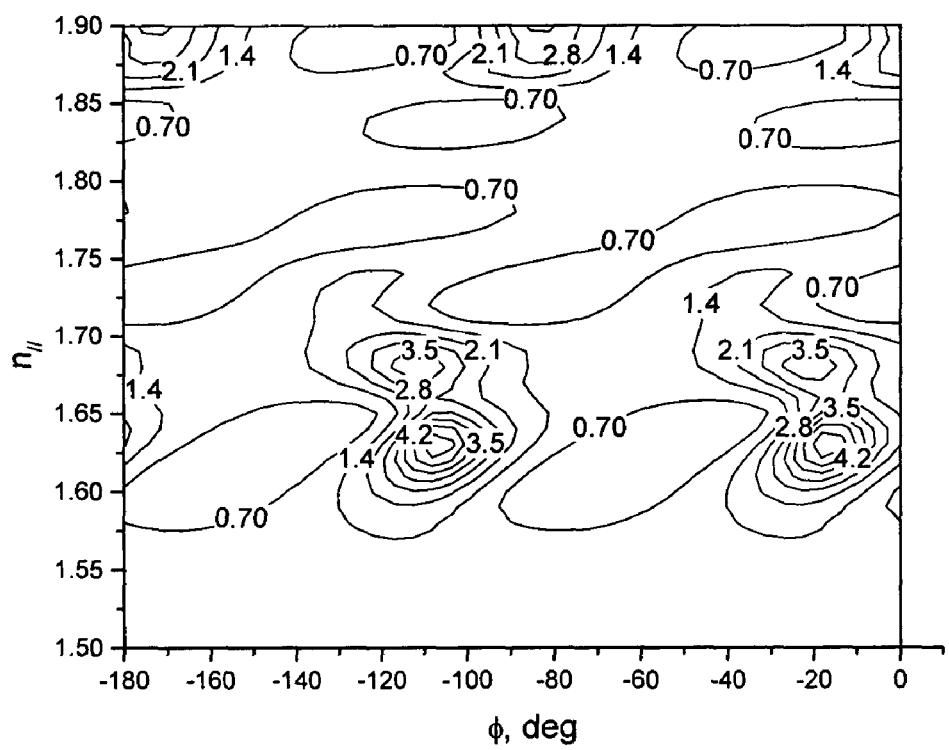
Figure 3:
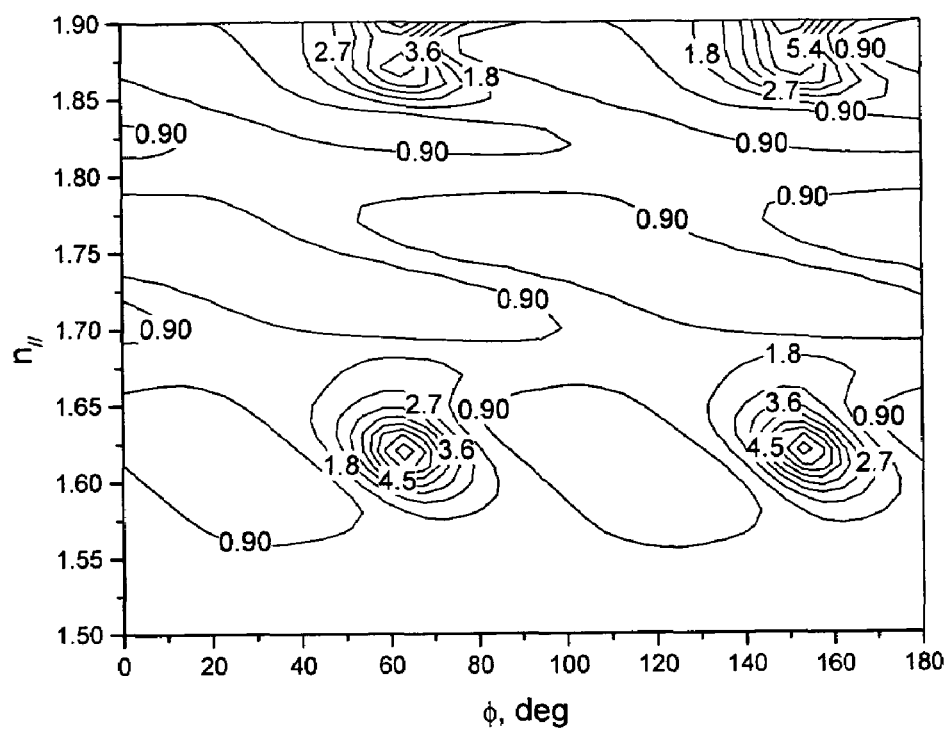
FIGS. 3a and 3b are the optimization maps for 200° STN with a single front polarizer ($\lambda$=550 nm) for the left-handed twist with the front easy axis at +120° (FIG. 3a) and for the right-handed twist with the rear easy axis at +120° (FIG. 3b).
Figure 3:
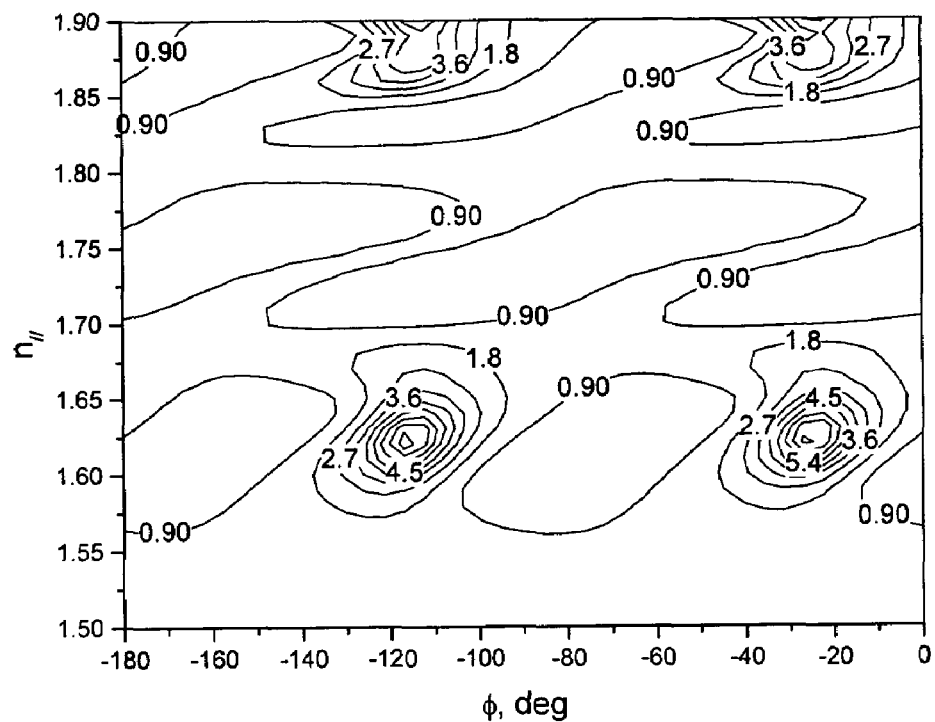
Figure 4:
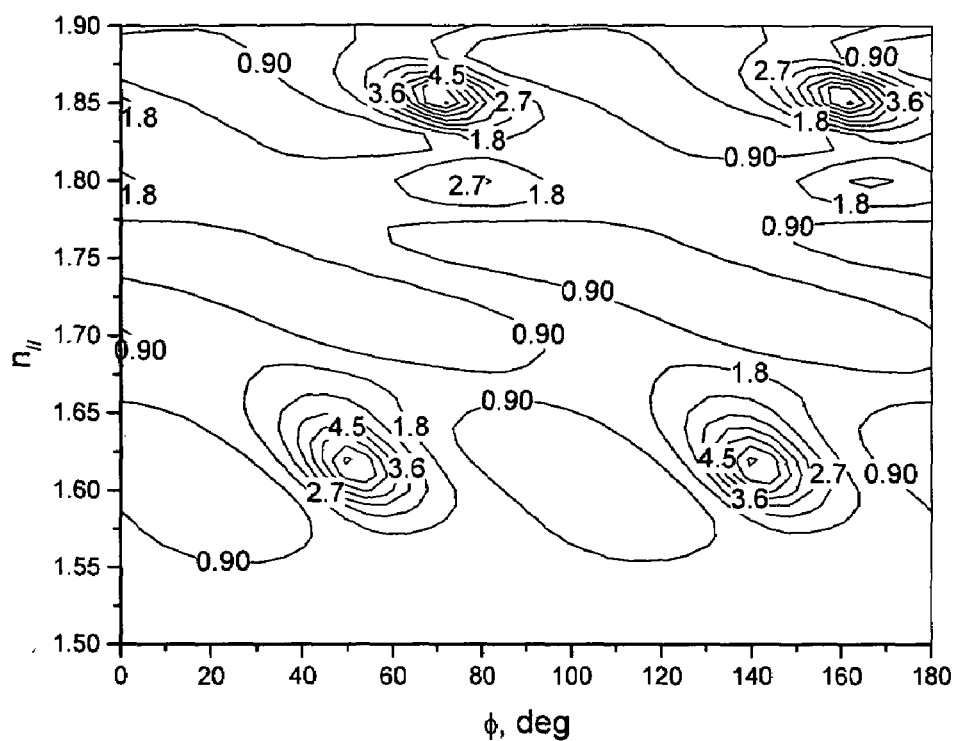
FIGS. 4a and 4b are the optimization maps for 220° STN with a single front polarizer (λ=550 nm) for the left-handed twist with a front easy axis at +120° (FIG. 4a) and for the right-handed twist with a rear easy axis at +120° (FIG. 4b).
Figure 4:
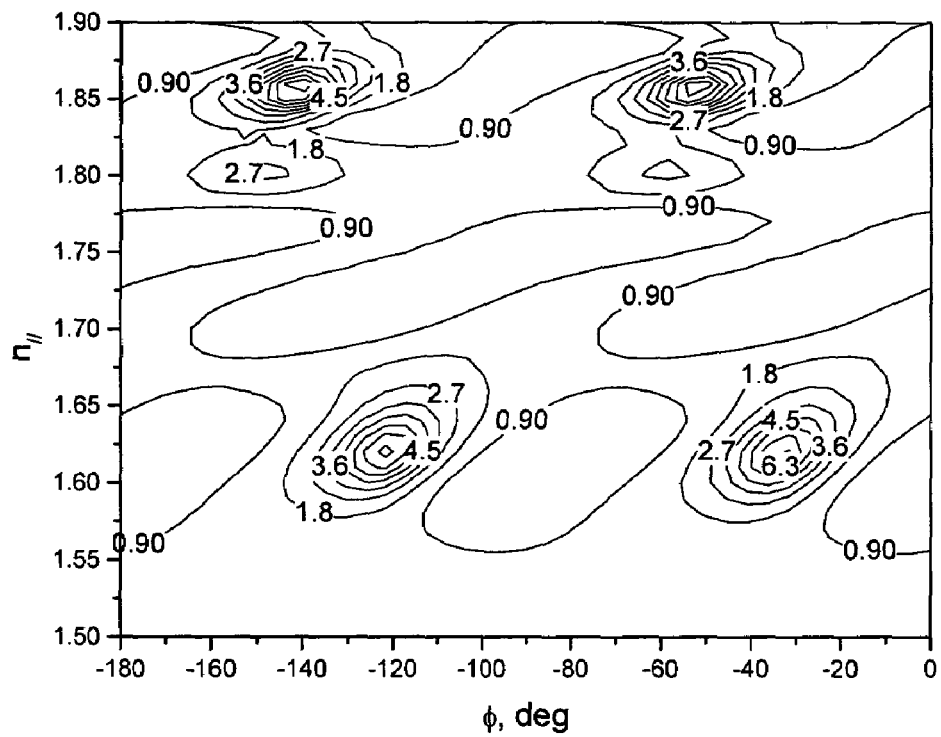
Figure 5:
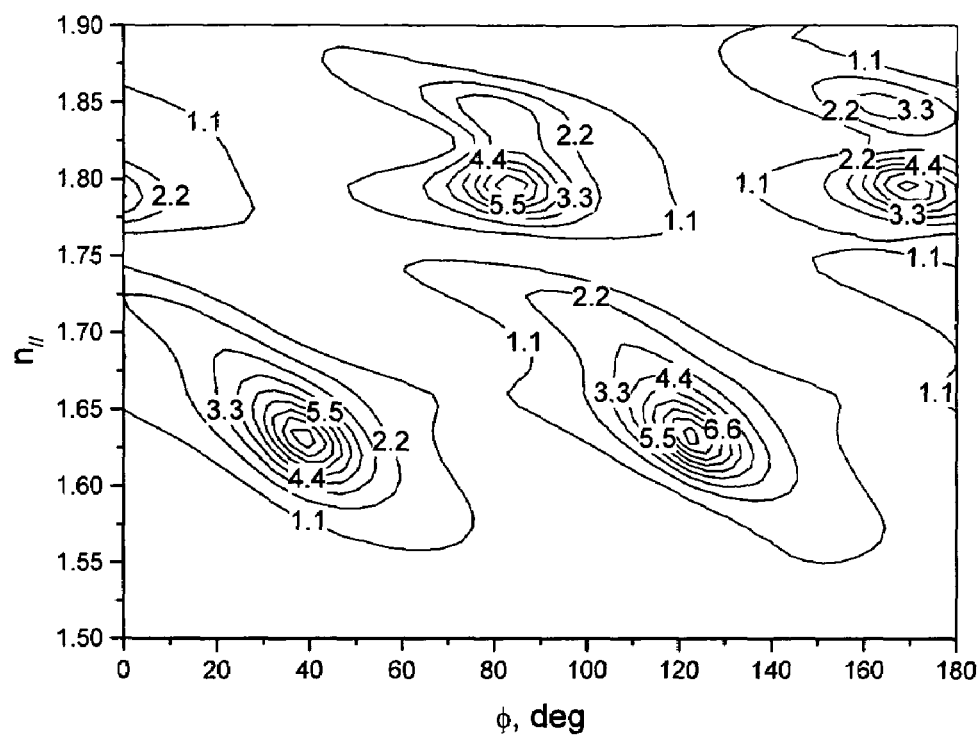
FIGS. 5a and 5b are the optimization maps for 240° STN with a single front polarizer (λ=550 nm) for the left-handed twist with a front easy axis at +120° (FIG. 5a) and for the right-handed twist with a rear easy axis at +120° (FIG. 5b).
Figure 5:
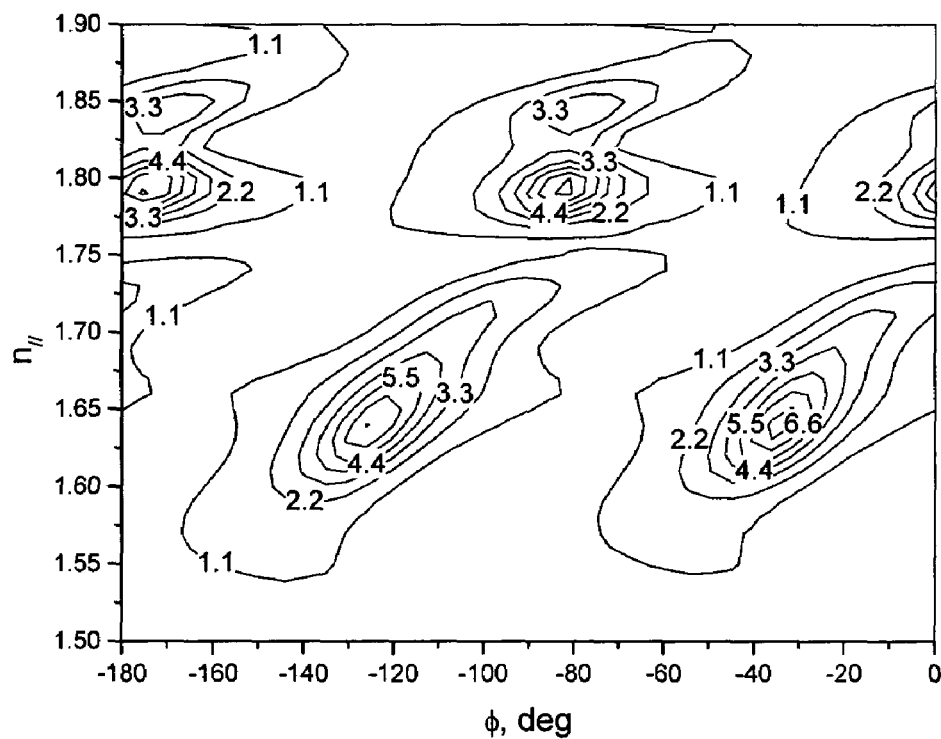
Figure 6:
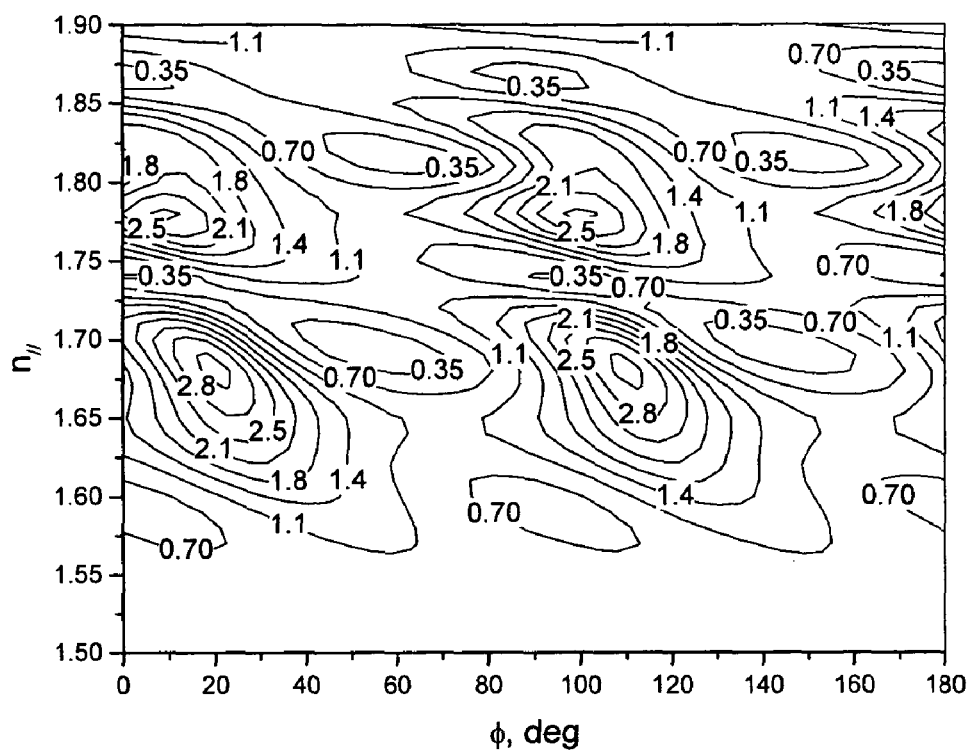
FIGS. 6a and 6b are the optimization maps for 260° STN with a single front polarizer (λ=550 nm) for the left-handed twist with a front easy axis at +120° (FIG. 6a) and for the right-handed twist with a rear easy axis at +120° (FIG. 6b).
Figure 6:
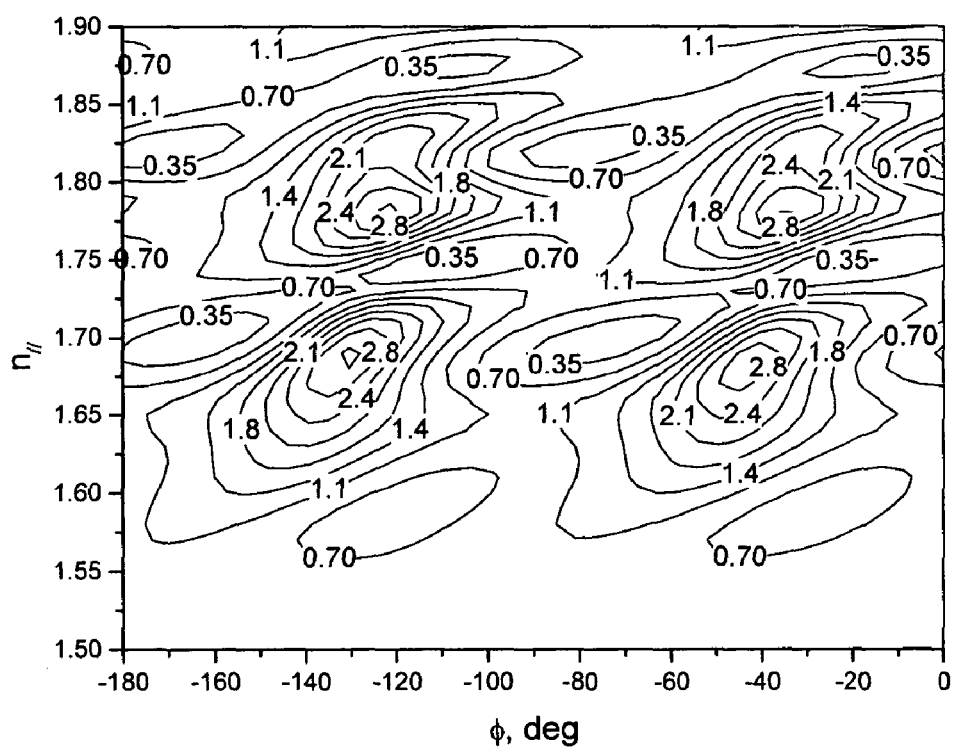

The schematic of one example of the simulated designs is shown in FIG. 1b. The schematic includes a light source 1, a conventional O-type polarizer 19, a front glass plate 2, a front optically transparent electrode (ITO layer) 3, a front alignment PI-layer 6, a CNLC layer 7, a rear alignment PI-layers 8, a rear optically transparent electrode (ITO layer) 10, a rear glass plate 11 and a reflector 12, which represents a mirror. In FIG. 1b, the referenced coordinate axes (x, y, z) (Laboratory frame) are illustrated. The disclosed normally white, supertwist nematic liquid crystal display of reflective type is characterized by several angles:

$\phi_1$ is the angle of the alignment direction of the liquid crystal director at the front surface of the LC layer (front easy axis) with respect to the x-axis of the Laboratory frame;

$\phi_2$ is the angle of the alignment direction of the liquid crystal director at the rear surface of the LC layer (rear easy axis) with respect to the x-axis of the Laboratory frame; and $\phi$ is the angle of the transmission axis of the front polarizer with respect to the x-axis of the Laboratory frame.

The direction of the front easy axis of the CNLC layer coincides with the rubbing direction at the front surface. On the contrary, the direction of the rear easy axis of the CNLC layer and the rubbing direction at the rear surface are differed in 180 degrees.

The mentioned angles ($\phi_1$, $\phi_2$, and $\phi$) are measured from the x-axis in the x-y plane of the selected coordinate system (Laboratory frame). The x-y plane is parallel to the layers of the display. The z-axis points from the light source to the display and is perpendicular to the layers of the display. The angles measured from the x-axis in clockwise direction are considered to be positive and the angles measured from the x-axis in counterclockwise direction are considered to be negative. The performance of the design does not depend on the particular choice of the coordinate system.

To simulate the electrooptical behavior of liquid crystal displays, two principal problems must be solved. The first one is related to the distribution of the CNLC director in an electric field, while the second one is related to the optics evaluation.

In a most general form taking into account the hydrodynamic back flow effects, the Ericksen-Leslie equations for the CNLC director $n=(n_x, n_y, n_z)$ can be written as follows [P. G. de Gennes and J. Prost, The Physics of Liquid Crystals, Oxford University Press, New York 1993]:

$$\rho\frac{\partial V_x}{\partial t} = \frac{\partial}{\partial z}\left[\begin{array}{l}\alpha_2 n_z\frac{\partial n_x}{\partial t} + \alpha_3 n_x\frac{\partial n_z}{\partial t} + \frac{1}{2}\alpha_3 n_x n_y V_y' + \\ \frac{1}{2}(2\alpha_1 n_x^2 n_z^2 - \alpha_2 n_z^2 + \alpha_3 n_x^2 + \alpha_4 + \alpha_5 n_z^2 + \alpha_6 n_x^2)V_x'\end{array}\right] \quad (1.1)$$

$$\rho\frac{\partial V_y}{\partial t} = \frac{\partial}{\partial z}\left[\begin{array}{l}\alpha_2 n_z\frac{\partial n_y}{\partial t} + \alpha_3 n_y\frac{\partial n_z}{\partial t} + \frac{1}{2}\alpha_3 n_x n_y V_x' + \\ \frac{1}{2}(2\alpha_1 n_y^2 n_z^2 - \alpha_2 n_z^2 + \alpha_3 n_y^2 + \alpha_4 + \alpha_5 n_z^2 + \alpha_6 n_y^2)V_y'\end{array}\right] \quad (1.2)$$

$$I\frac{\partial^2 n_x}{\partial t^2} = \lambda n_x - \frac{\partial F}{\partial n_x} + \frac{d}{dz}\frac{\partial F}{\partial n_x'} - \gamma\frac{\partial n_x}{\partial t} - \alpha_2 n_z V_x' \quad (1.3)$$

$$I\frac{\partial^2 n_y}{\partial t^2} = \lambda n_y - \frac{\partial F}{\partial n_y} + \frac{d}{dz}\frac{\partial F}{\partial n_y'} - \gamma\frac{\partial n_y}{\partial t} - \alpha_2 n_z V_y' \quad (1.4)$$

$$I\frac{\partial^2 n_z}{\partial t^2} = \lambda n_z - \frac{\partial F}{\partial n_z} + \frac{d}{dz}\frac{\partial F}{\partial n_z'} - \gamma\frac{\partial n_z}{\partial t} - \alpha_3 n_x V_x' - \alpha_3 n_y V_y' \quad (1.5)$$

where $\rho$ is CNLC density, I is inertia moment per unit volume, $V_x$, and $V_y$ are x- and y-components of the flow velocity, $V_{x,y}' = \partial V_{x,y}/\partial z$, $\lambda$ is Lagrange multiplier, $\alpha_i$ is Leslie viscosity coefficient, and $\gamma = \alpha_3 - \alpha_2$ and is rotational viscosity. In the above equations, F is the CNLC free energy density defined as follows:

$$F = \frac{1}{2}[K_{11}(div\,n)^2 + K_{22}(n\cdot rot\,n + q_0)^2 + K_{33}(n\times rot\,n)^2] + \quad (2)$$

$$\frac{D_z^2}{2\varepsilon_\perp\left(1 + \frac{\Delta\varepsilon}{\varepsilon_\perp}n_z^2\right)},$$

$$D_z = \frac{\varepsilon_\perp U_{LC}}{\int_z\left(1 + \frac{\Delta\varepsilon}{\varepsilon_\perp}n_z^2\right)^{-1}dz}, \quad (3)$$

where $K_{11}$, $K_{22}$, $K_{33}$ are the CNLC elastic constants, $\Delta\in$ and $\in_\perp$ are the dielectric anisotropy and dielectric constant component perpendicular to the CNLC director respectively, $q_0$ is the inverse pitch wavenumber (it is not zero in the case of a CNLC material), $D_z$ is z-component of the dielectric displacement and $U_{LC}$ is the voltage applied to the CNLC layer. The laboratory xyz frame is chosen in a way that xy plane is parallel to the CNLC cell substrates. If the inertia and viscosity terms are neglected, then the system (1) is reduced and the problem becomes a static one, so the CNLC director distribution can be found for a given voltage applied to the CNLC layer. The results presented here are based on both dynamic and static calculations of the CNLC director distribution under applied electric field using special software for solving the system (1) at proper boundary conditions corresponding to the different twist angles of the CNLC director.

The second task is connected to the optics calculations for the total system, which, in general case, consists of polarizers, glass plates, electrodes and liquid crystal layer. This requires solving Maxwell equations. The exact method to do this has been proposed by Berreman [D. W. Berreman, *J. Opt. Soc. Am.*, 62, p. 502–510, 1972]. According to Berreman, if the anisotropic optical media is inhomogeneous only in one direction, then the six Maxwell equations for electromagnetic field are reduced to the four equations, which can be written in matrix form as follows:

$$\frac{\partial}{\partial z}\chi = \frac{i\omega}{c}\Delta\chi, \quad (4)$$

where:

$$\chi = \begin{pmatrix} E_x \\ H_y \\ E_y \\ -H_x \end{pmatrix}, \quad \Delta = \begin{pmatrix} \Delta_{11} & \Delta_{12} & \Delta_{13} & \Delta_{14} \\ \Delta_{21} & \Delta_{22} & \Delta_{23} & \Delta_{24} \\ \Delta_{31} & \Delta_{32} & \Delta_{33} & \Delta_{34} \\ \Delta_{41} & \Delta_{42} & \Delta_{43} & \Delta_{44} \end{pmatrix},$$

$E_x$, $E_y$, $H_x$, and $H_y$ are the tangential components of the electric and magnetic fields respectively. In the cases where magnetic anisotropy and optical activity are neglected, the number of nonzero components of $\Delta$ is reduced to 10, and they are expressed in terms of the principal values of the dielectric tensor components and Euler angles for the principal axes of this tensor [D. W. Berreman, *J. Opt. Soc. Am.*, 62, p. 502–510, 1972]. Integration of equation (4) in the case of layered optical system of thickness h results in the following expression for the field at the output of the optical system:

$$\chi(h) = (P(h_1)\cdot P(h_2)\ldots P(h_n))\cdot\chi(0) \quad (5)$$

where $\chi(0)$ is the field at the input of the optical system, and $P(h_i)$ is the transfer matrix for each of n optical elements.

Thus, the solution of the optical problem is reduced to calculations of the transfer matrix for all the optical elements and finding of the transmission and reflection coefficients for the total system. The general and efficient implementation of the method to perform such calculations are proposed by S. P. Palto in J. of Experimental and Theoretical physics, vol. 92, No. 4, 2001, pp. 552–560, and used in the calculations presented herein.

The simulation was performed for a virtual CNLC material having the same elastic constants and low frequency dielectric anisotropy as MLC-6806-000 liquid crystal material (($k_1$, $k_2$, $k_3$)=(13.2, 6.5, 18.3), ($\in_\|$,$\in_\perp$)=(35,10)). The calculations were performed for partially coherent light of the coherence length of 100 μm with the middle wavelength at 550 nm. The ordinary refractive index of the CNLC material is n=1.495≅1.5. The thickness of CNLC layer is d=5 μm. The thickness of the thin crystal film (TCF) is 0.5 μm. The optical anisotropy Δnd of the CNLC is a variable parameter. Its desired value depends on the twist angle of the CNLC director. The angular orientation of the front polarizer is also a variable parameter having the desired value dependent on the twist angle.

The $SiO_2$ layers were excluded from the simulation for simplicity because they do not change the desired values of the polarizer orientation or birefringence of the CNLC material, and they do not significantly influence the optical performance.

For all designs, the pretilt angle was fixed at 4° at two boundaries despite the fact that the twist angle higher than 240 degrees requires higher pretilt angles to escape the formation of domains. The fixed pretilt angle allows making the comparison of the different designs. Separate simulations made for 260° designs showed that the increase of the pretilt angle does not lead to better optical performance, which is not desirable for 260° STN in comparison with the other designs having lower twist angles.

The natural pitch value of the CNLC material may be varied to obtain different twist angles. In the simulations, the inverse natural pitch values of ±0.1, ±0.11, ±0.12, ±0.13, ±0.14 μm$^{-1}$ are used for ±180, ±200, ±220, ±240, and ±260° STNs respectively (the CNLC layer thickness is 5 μm (micrometer); the sign "+" means the right-handed twist, and the sign "−" means the left-handed twist).

The O-type front polarizer is assumed to be close to an ideal one (characterized by absorption coefficient $(k_o, k_e)$= (0, 0.03) μm$^{-1}$, refractive indices $n_o=n_e=1.5$ and thickness of 200 μm).

The optimization maps, which show the contrast ratio versus the front polarizer axis orientation ($\phi$) and the extraordinary reflective index ($n_{//}$) of the CNLC material, are shown in FIGS. 2–6.

FIGS. 2a and 2b are optimization maps for 180° STN of reflective type with a single internal TCF front polarizer (λ=550 nm). FIG. 2a shows the dependence of the contrast ratio at normal light incidence for the left-handed twist with a front easy axis at +120° on the transmission axis angle ($\phi$) of the front polarizer and the extraordinary index of the CNLC material ($n_{//}$). FIG. 2b shows the dependence of the contrast ratio at normal light incidence for the right-handed twist with a rear easy axis at +120° on the transmission axis angle ($\phi$) of the front polarizer and the extraordinary index of the CNLC material ($n_{//}$). In FIGS. 2a and 2b, the closed curves represent a constant level of contrast ratio in a plane of parameters n// and $\phi$. The curves in FIGS. 2a and 2b are shown with a variable increment of contrast ratio of about 0.9. As the contrast ratio increases, the appropriate area decreases. For the maximum value of the contrast ratio, the appropriate area degenerates into a point. The maximum contrast ratio achievable using the TCF is about 7 (not shown in FIGS. 2a and 2b because of large density of curves). FIG. 2a shows that there are desired orientations of the optical transmission axis of the front polarizer, fabricated from optically anisotropic dichroic thin crystal film, and that there are corresponding values of the product dΔn, which are: $\phi$=75±3° and Δnd=0.64 μm for left-handed twist design. FIG. 2b shows that there are desired orientations of the optical transmission axis of the front polarizer, fabricated from optically anisotropic dichroic thin crystal film, and that there are corresponding values of the product dΔn, which are: $\phi$=−15±3° and Δnd=0.64 μm for right-handed twist design.

FIGS. 3a and 3b are optimization maps for 200° STN of reflective type with a single internal TCF polarizer (λ=550 nm). FIG. 3a shows the dependence of the contrast ratio at normal light incidence for the left-handed twist with a front easy axis at +120° on the transmission axis angle ($\phi$) of the front polarizer and the extraordinary index of the liquid crystal material ($n_{//}$). FIG. 3b shows the dependence of the contrast ratio at normal light incidence for the right-handed twist with a rear easy axis at +120° on the transmission axis angle ($\phi$) of the front polarizer and the extraordinary index of the liquid crystal material ($n_{//}$). In FIGS. 3a and 3b, the closed curves represent a constant level of contrast ratio in a plane of parameters n// and $\phi$. The curves in FIGS. 3a and 3b are shown with a variable increment of contrast ratio of about 0.9. As the contrast ratio increases, the appropriate area decreases. For the maximum value of the contrast ratio, the appropriate area degenerates into a point. The maximum contrast ratio achievable using the TCF is about 9 (not shown in FIGS. 3a and 3b because of large density of curves). FIG. 3a shows that there are desired orientations of the optical transmission axis of the front polarizer, fabricated from optically anisotropic dichroic thin crystal film, and that there are corresponding values of the product dΔn, which are: $\phi$=65±3° and Δnd=0.60 μm for left-handed twist design. FIG. 3b shows that there are desired orientations of the optical transmission axis of the front polarizer, fabricated from optically anisotropic dichroic thin crystal film, and that there are corresponding values of the product dΔn, which are: $\phi$=−25±3° and Δnd=0.60 μm for right-handed twist design.

FIGS. 4a and 4b are optimization maps for 220° STN of reflective type with a single internal TCF front polarizer (λ=550 nm). FIG. 4a shows the dependence of the contrast ratio at normal light incidence for the left-handed twist with a front easy axis at +120° on the transmission axis angle ($\phi$) of the polarizer and the extraordinary index of the liquid crystal material ($n_{//}$). FIG. 4b shows the dependence of the contrast ratio at normal light incidence for the right-handed twist with a rear easy axis at +120° on the transmission axis angle ($\phi$) of the front polarizer and the extraordinary index of the liquid crystal material ($n_{//}$). In FIGS. 4a and 4b, the closed curves represent a constant level of contrast ratio in a plane of parameters n// and $\phi$. The curves in FIGS. 4a and 4b are shown with a variable increment of contrast ratio of about 0.9. As the contrast ratio increases, the appropriate area decreases. For the maximum value of the contrast ratio, the appropriate area degenerates into a point. The maximum contrast ratio achievable using the TCF is about 9 (not shown in FIGS. 4a and 4b because of large density of curves). FIG. 4a shows that there are desired orientations of the optical transmission axis of the front polarizer, fabricated from optically anisotropic dichroic thin crystal film, and that there are corresponding values of the product dΔn, which are: $\phi$=50±3° and Δnd=0.59 μm for left-handed twist design. FIG. 4b shows that there are desired orientations of the optical transmission axis of the front polarizer, fabricated from optically anisotropic dichroic thin crystal film, and that there are corresponding values of the product dΔn, which are: $\phi$=−31±3° and Δnd=0.591 μm for right-handed twist design.

FIGS. 5a and 5b are optimization maps for 240° STN of reflective type with a single internal TCF front polarizer (λ=550 nm). FIG. 5a shows the dependence of the contrast ratio at normal light incidence for the left-handed twist with a front easy axis at +120° on the transmission axis angle ($\phi$) of the front polarizer and the extraordinary index of the liquid crystal material ($n_{//}$). FIG. 5b shows the dependence of the contrast ratio at normal light incidence for the right-handed twist with a rear easy axis at +120° on the transmission axis angle ($\phi$) of the front polarizer and the extraordinary index of the liquid crystal material ($n_{//}$). In FIGS. 5a and 5b, the closed curves represent a constant level of contrast ratio in a plane of parameters n// and ϕ. The curves in FIGS. 5a and 5b are shown with a variable increment of contrast ratio of about 1.1. As the contrast ratio increases, the appropriate area decreases. For the maximum value of the contrast ratio, the appropriate area degenerates into a point. The maximum contrast ratio achievable using the TCF is about 9 (not shown in FIGS. 5a and 5b because of large density of curves). FIG. 5a shows that there are desired orientations of the optical transmission axis of the front polarizer, fabricated from optically anisotropic dichroic thin crystal film, and that there are corresponding values of the product dΔn, which are: ϕ=38±3° and Δnd=0.65 μm for left-handed twist design. FIG. 5b shows that there are desired orientations of the optical transmission axis of the front polarizer, fabricated from optically anisotropic dichroic thin crystal film, and that there are corresponding values of the product Δnd, which are: ϕ=−38±3° and Δnd=0.65 μm for right-handed twist design.

FIGS. 6a and 6b are optimization maps for 260° STN of reflective type with a single internal TCF front polarizer (λ=550 nm). FIG. 6a shows the dependence of the contrast ratio at normal light incidence for the left-handed twist with a front easy axis at +120° on the transmission axis angle (ϕ) of the front polarizer and the extraordinary index of the liquid crystal material ($n_{//}$). FIG. 6b shows the dependence of the contrast ratio at normal light incidence for the right-handed twist with a rear easy axis at +120° on the transmission axis angle (ϕ) of the front polarizer and the extraordinary index of the liquid crystal material ($n_{//}$). In FIGS. 6a and 6b, the closed curves represent a constant level of contrast ratio in a plane of parameters n// and ϕ. The curves in FIGS. 6a and 6b are shown with a variable increment of contrast ratio of about 0.3 to 0.4. As the contrast ratio increases, the appropriate area decreases. For the maximum value of the contrast ratio, the appropriate area degenerates into a point. The maximum contrast ratio achievable using the TCF is about 4 (not shown in FIGS. 6a and 6b because of large density of curves). FIG. 6a shows that there are desired orientations of the optical transmission axis of the front polarizer, fabricated from optically anisotropic dichroic thin crystal film, and that there are corresponding values of the product Δnd, which are: ϕ=20±3° and Δnd=0.90 μm for left-handed twist design. FIG. 6b shows that there are desired orientations of the optical transmission axis of the front polarizer, fabricated from optically anisotropic dichroic thin crystal film, and that there are corresponding values of the product Δnd, which are: ϕ=−40±3° and Δnd=0.90 μm for right-handed twist design.

The ordinary reflective index of the CNLC is fixed at the value of 1.5, but it does not limit the generality, because the results should be associated with the optical retardation Δnd of the CNLC layer. From the map data, two possible modes of design operation can be observed. One mode corresponds to low optical anisotropy of the CNLC material. The second mode is high birefringence mode. For its operation, it requires either a high thickness of the CNLC layer or a CNLC material with high birefringence (if the CNLC layer thickness is about 5 μm or less). The first mode is preferable when a neutral color appearance is needed because the low birefringence results in low spectral dispersion.

From the optimization maps, the optimal angles of the front polarizer orientation and optimal optical retardation of the CNLC layer can be derived for maximum performance.

Figure 7A:
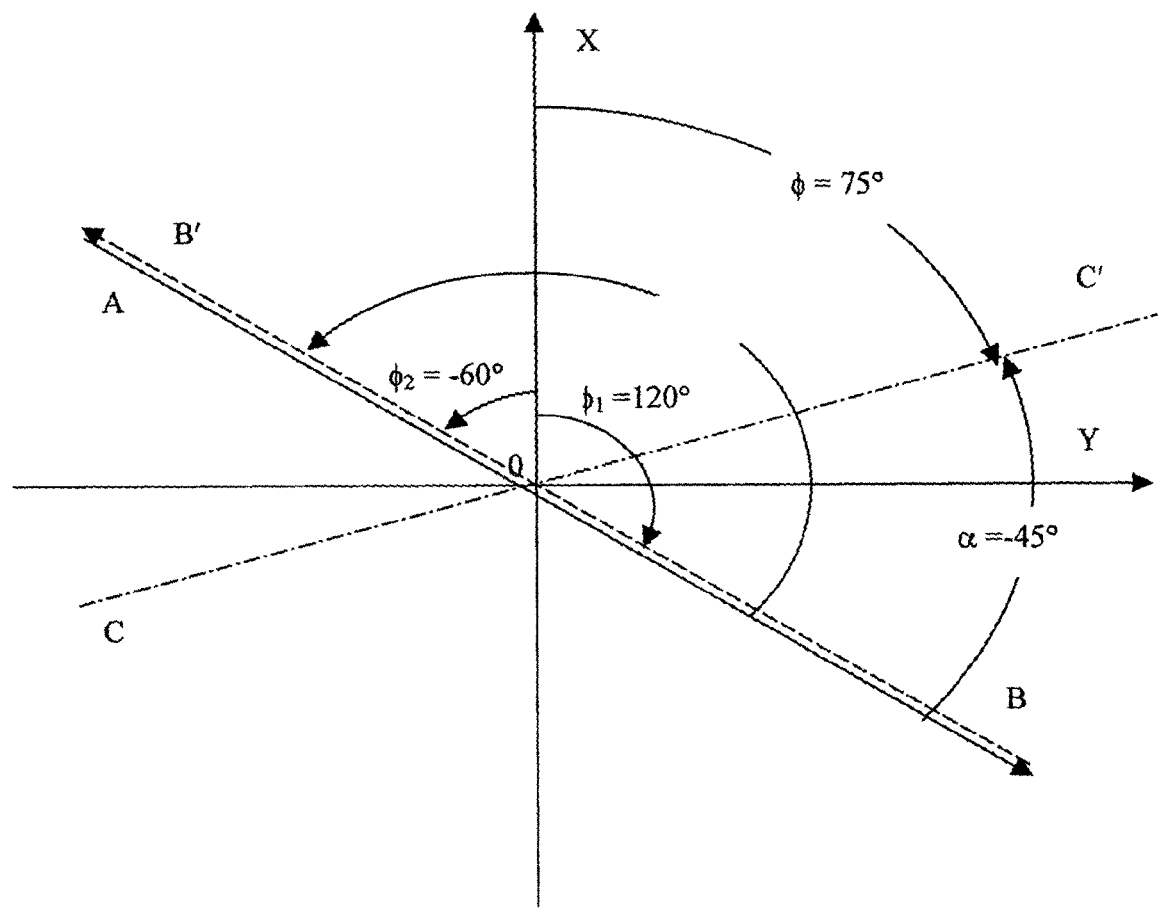
FIGS. 7a and 7b are schematics illustrating the orientation of the optical transmission axis of the front polarizer and the front and rear easy axes of the chiral nematic liquid crystal having a left-handed twist angle of −180° (FIG. 7a) and a right-handed twist angle of +180° (FIG. 7b).

FIG. 7a illustrates one embodiment of the invention in which the CNLC has a twist angle of −180 degree (left-handed twist). The alignment direction of the director at the front CNLC surface indicated by line A–A'(the front easy axis) is arranged to form an angle $\phi_1$=120° with respect to the x-axis. The alignment direction of the director at the rear CNLC surface indicated by line B–B' (the rear easy axis) is arranged to form an angle $\phi_2$=−60° with respect to the x-axis. Thus, the directors of the CNLC are rotated counterclockwise (left-handed twist) about the z-axis to an angle Φ=−180° from the front to the rear CNLC surface. The optical transmission axis of the front polarizer indicated by line C–C' is arranged to form a desired angle ϕ=75° with respect to the x-axis. The angle α formed between the transmission axis of the front polarizer and the front easy axis is also shown in FIG. 7a. The desired value of angle α is −45°.

Figure 7B:
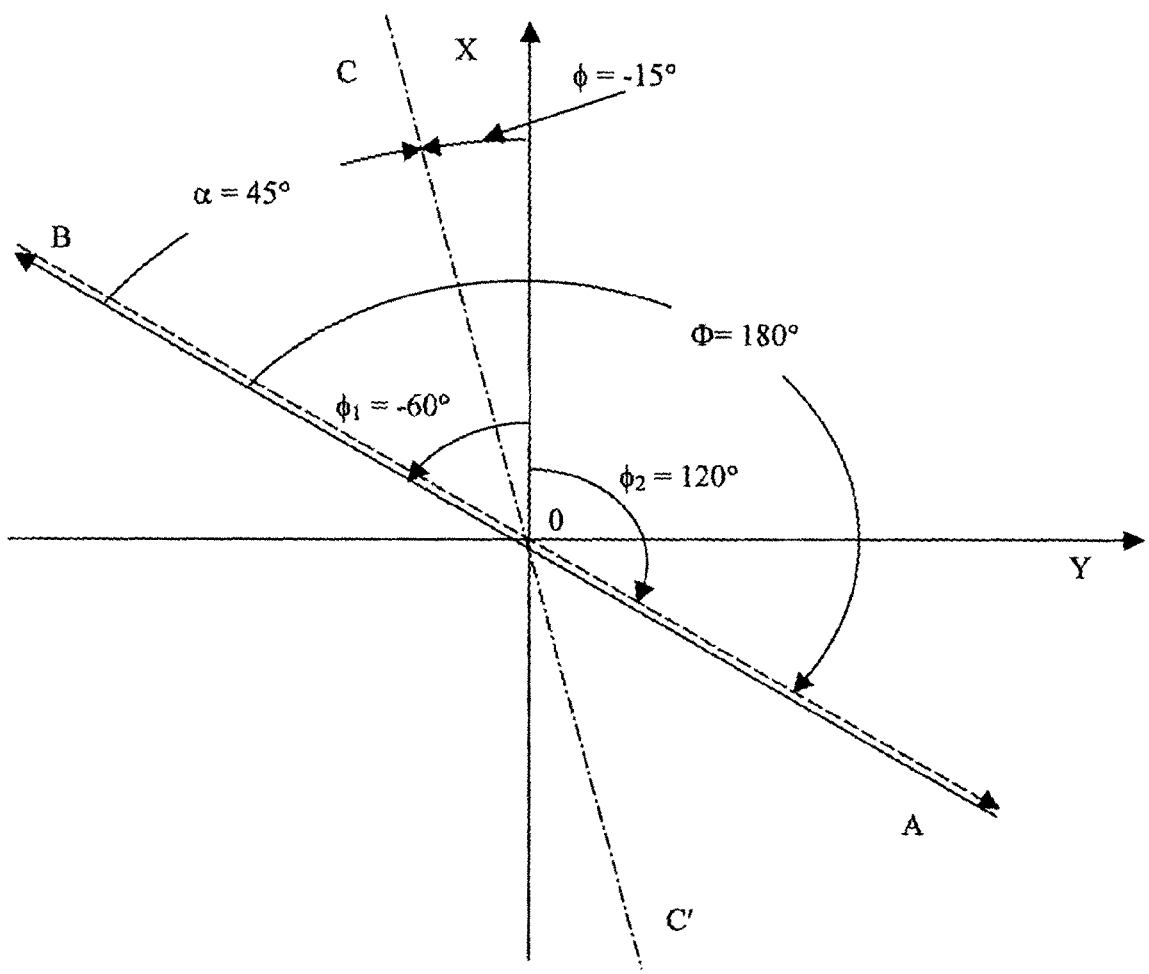

FIG. 7b illustrates one embodiment of the invention in which the CNLC has a twist angle of 180 degree (right-handed twist). The alignment direction of the director at the front CNLC surface indicated by line A–A' (the front easy axis) is arranged to form an angle $\phi_1$=−60° with respect to the x-axis. The alignment direction of the director at the rear CNLC surface indicated by line B–B' (the rear easy axis) is arranged to form an angle $\phi_2$=120° with respect to the x-axis. Thus, the directors of the CNLC are rotated clockwise (right-handed twist) about the z-axis to an angle Φ=180° from the front to the rear CNLC surface. The optical transmission axis of the front polarizer indicated by line C–C' is arranged to form a desired angle ϕ=−15° with respect to the x-axis. The angle α formed between the transmission axis of the front polarizer and the front easy axis is also shown in FIG. 7b. The desired value of angle α is 45°.

Figure 8A:
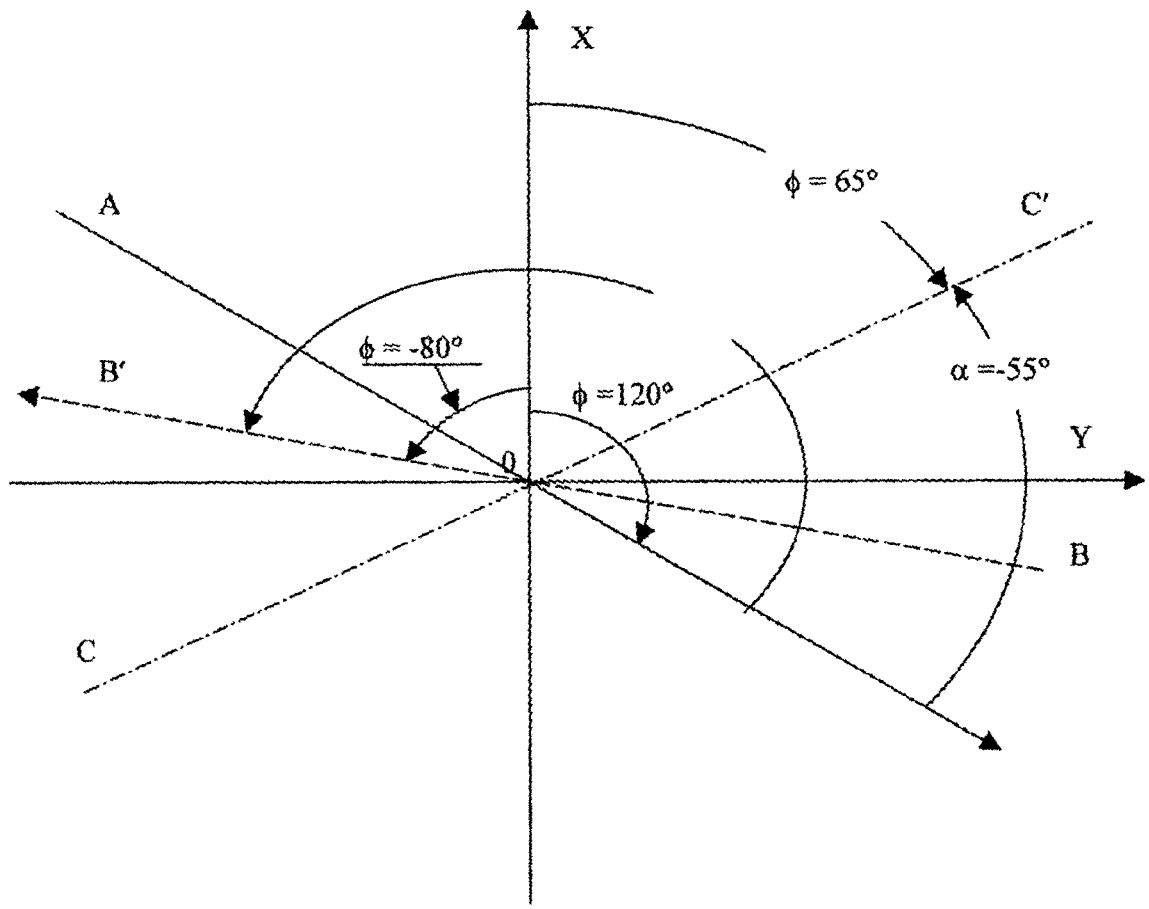
FIGS. 8a and 8b are schematics illustrating the orientation of the optical transmission axis of the front polarizer and the front and rear easy axes of the chiral nematic liquid crystal having a left-handed twist angle of −200° (FIG. 8a) and a right-handed twist angle of +200° (FIG. 8b).

FIG. 8a illustrates one embodiment of the invention in which the CNLC has a twist angle of −200 degree (left-handed twist). The alignment direction of the director at the front CNLC surface indicated by line A–A' (the front easy axis) is arranged to form an angle $\phi_1$=120° with respect to the x-axis. The alignment direction of the director at the rear CNLC surface indicated by line B–B' (the rear easy axis) is arranged to form an angle $\phi_2$=−80° with respect to the x-axis. Thus, the directors of the CNLC are rotated counterclockwise (left-handed twist) about the z-axis to an angle Φ=−200° from the front to the rear CNLC surface. The optical transmission axis of the front polarizer indicated by line C–C' is arranged to form a desired angle ϕ=65° with respect to the x-axis. The angle α formed between the transmission axis of the front polarizer and the front easy axis is also shown in FIG. 8a. The desired value of angle α is −55°.

Figure 8B:
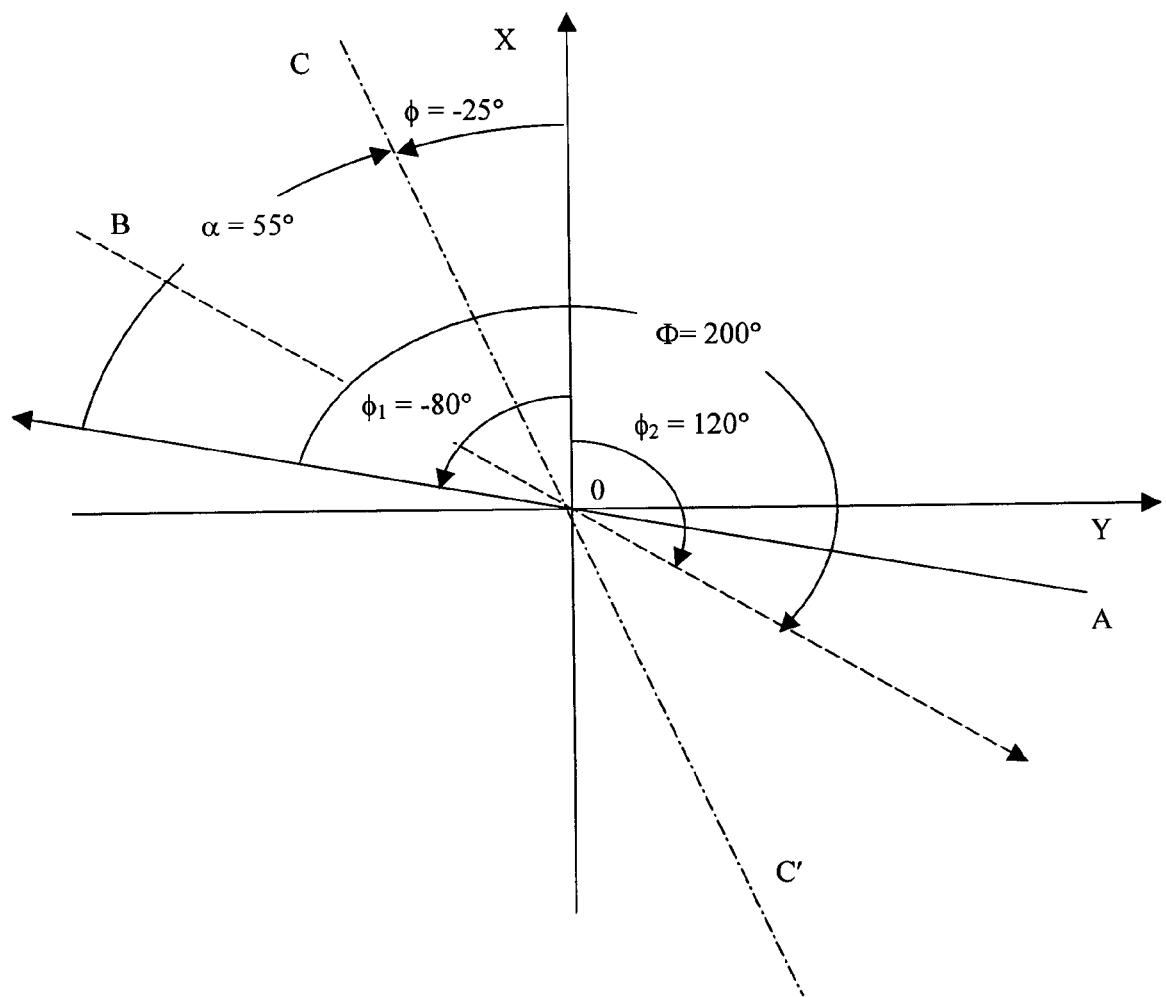

FIG. 8b illustrates one embodiment of the invention in which the CNLC has a twist angle of 200 degree (right-handed twist). The alignment direction of the director at the front CNLC surface indicated by line A–A' (the front easy axis) is arranged to form an angle $\phi_1$=80° with respect to the x-axis. The alignment direction of the director at the rear CNLC surface indicated by line B–B' (the rear easy axis) is arranged to form an angle $\phi_2$=−120° with respect to the x-axis. Thus, the directors of the CNLC are rotated clockwise (right-handed twist) about the z-axis to an angle Φ=−200° from the front to the rear CNLC surface. The optical transmission axis of the front polarizer indicated by line C–C' is arranged to form a desired angle ϕ=−25° with respect to the x-axis. The angle α formed between the transmission axis of the front polarizer and the front easy axis is also shown in FIG. 8b. The desired value of angle α is 55°.

Figure 9A:
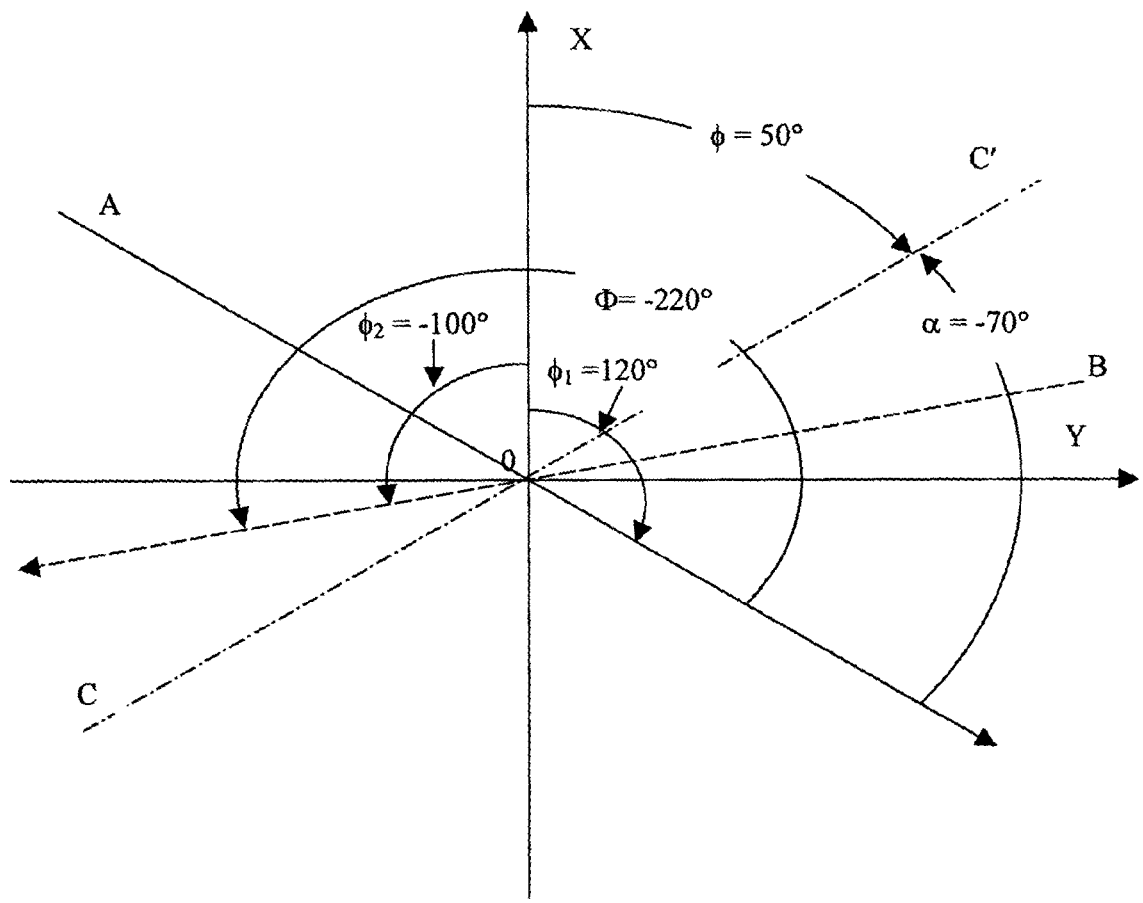
FIGS. 9a and 9b are schematics illustrating the orientation of the optical transmission axis of the front polarizer and the front and rear easy axes of the chiral nematic liquid crystal having a left-handed twist angle of −220° (FIG. 9a) and a right-handed twist angle of +220° (FIG. 9b).

FIG. 9a illustrates one embodiment of the invention in which the CNLC has a twist angle of −220 degree (left-handed twist). The alignment direction of the director at the front CNLC surface indicated by line A–A' (the front easy axis) is arranged to form an angle $\phi_1=120°$ with respect to the x-axis. The alignment direction of the director at the rear CNLC surface indicated by line B–B' (the rear easy axis) is arranged to form an angle $\phi_2=-100°$ with respect to the x-axis. Thus, the directors of the CNLC are rotated counterclockwise (left-handed twist) about the z-axis to an angle $\Phi=-220°$ from the front to the rear CNLC surface. The optical transmission axis of the front polarizer indicated by line C–C' is arranged to form a desired angle $\phi=50°$ with respect to the x-axis. The angle $\alpha$ formed between the transmission axis of the front polarizer and the front easy axis is also shown in FIG. 9a. The desired value of angle $\alpha$ is $-70°$.

Figure 9B:
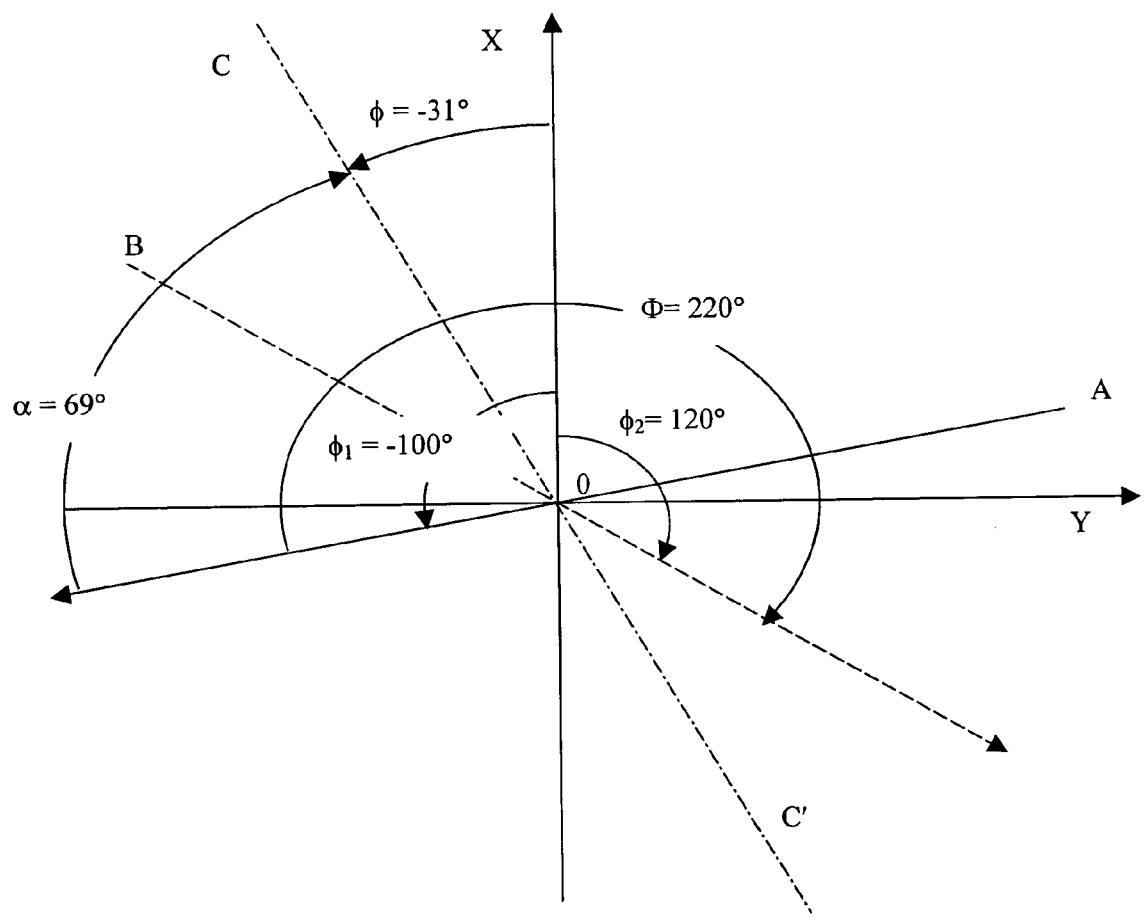

FIG. 9b illustrates one embodiment of the invention in which the CNLC has a twist angle of 220 degree (right-handed twist). The alignment direction of the director at the front CNLC surface indicated by line A–A' (the front easy axis) is arranged to form an angle $\phi_1=-100°$ with respect to the x-axis. The alignment direction of the director at the rear CNLC surface indicated by line B–B' (the rear easy axis) is arranged to form an angle $\phi_2=120°$ with respect to the x-axis. Thus, the directors of the chiral nematic liquid crystal are rotated clockwise (right-handed twist) about the z-axis to an angle $\Phi=220°$ from the front to the rear CNLC surface. The optical transmission axis of the front polarizer indicated by line C–C' is arranged to form a desired angle $\phi=-31°$ with respect to the x-axis. The angle $\alpha$ formed between the transmission axis of the front polarizer and the front easy axis is also shown in FIG. 9b. The desired value of angle $\alpha$ is 69°.

Figure 10A:
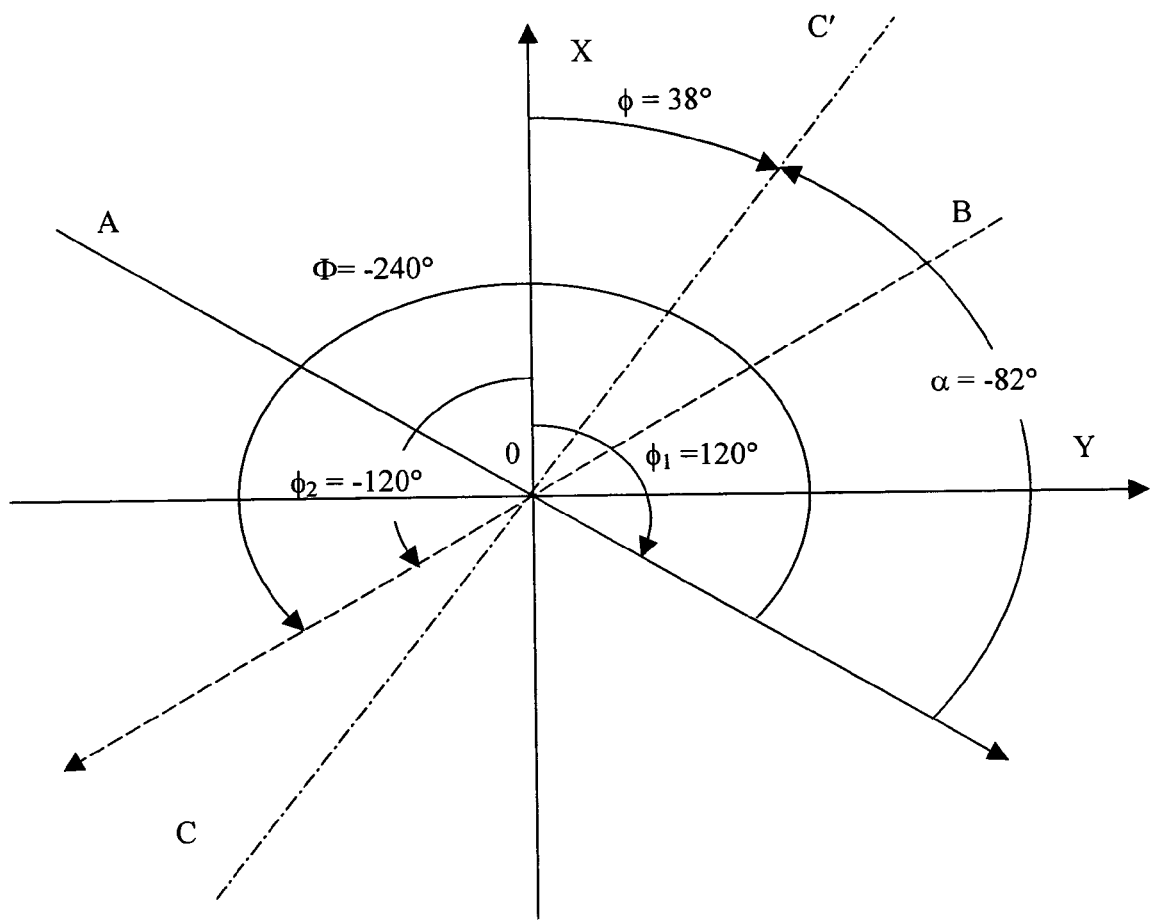
FIGS. 10a and 10b are schematics illustrating the orientation of the optical transmission axis of the front polarizer and the front and rear easy axes of the chiral nematic liquid crystal having a left-handed twist angle of −240° (FIG. 10a) and a right-handed twist angle of +240° (FIG. 10b).

FIG. 10a illustrates one embodiment of the invention in which the CNLC has a twist angle of −240 degree (left-handed twist). The alignment direction of the director at the front CNLC surface indicated by line A–A' (the front easy axis) is arranged to form an angle $\phi_1=120°$ with respect to the x-axis. The alignment direction of the director at the rear CNLC surface indicated by line B–B' (the rear easy axis) is arranged to form an angle $\phi_2=-120°$ with respect to the x-axis. Thus, the directors of the CNLC are rotated counterclockwise (left-handed twist) about the z-axis to an angle $\Phi=-240°$ from the front to the rear CNLC surface. The optical transmission axis of the front polarizer indicated by line C–C' is arranged to form a desired angle $\phi=38°$ with respect to the x-axis. The angle $\alpha$ formed between the transmission axis of the front polarizer and the front easy axis is also shown in FIG. 10a. The desired value of angle $\alpha$ is $-82°$.

Figure 10B:
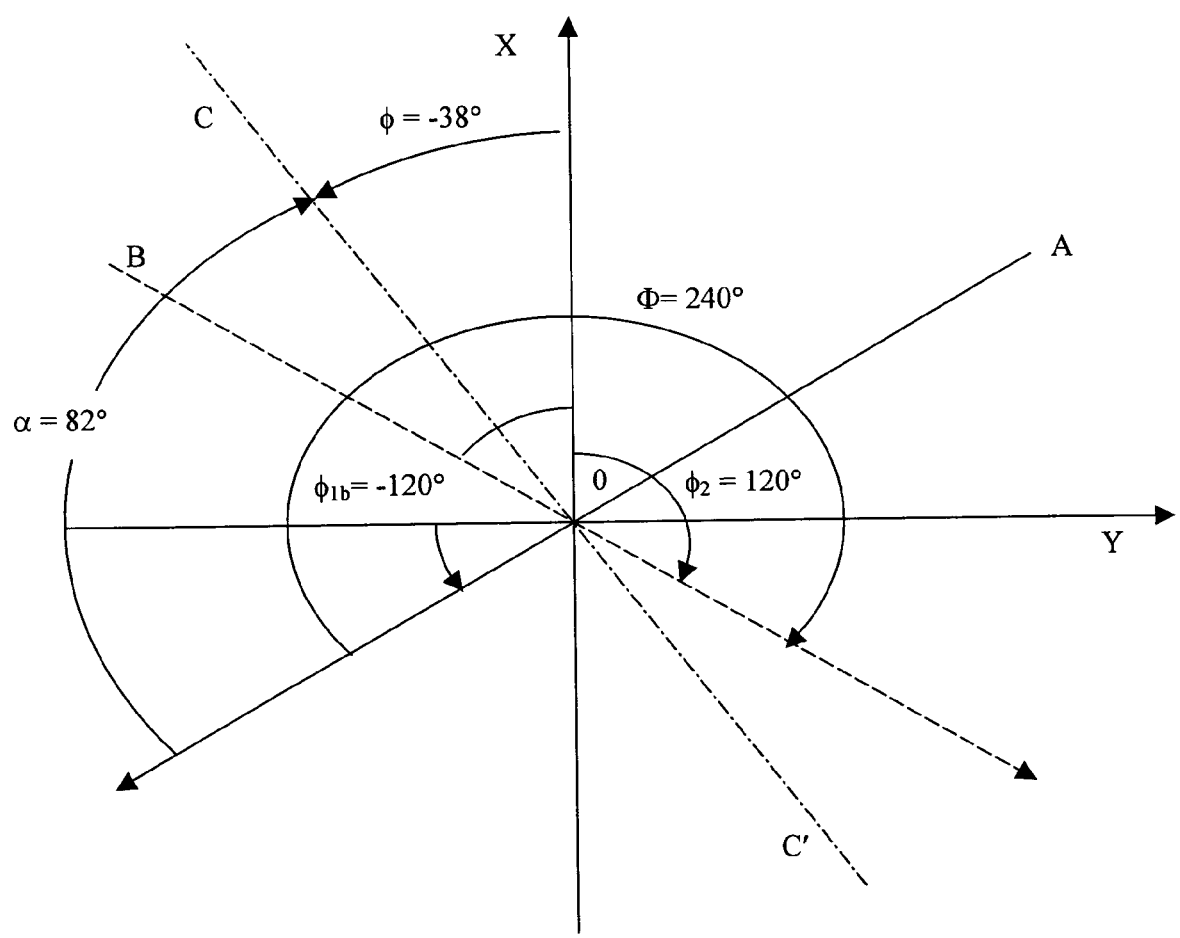

FIG. 10b illustrates one embodiment of the invention in which the CNLC has a twist angle of 240 degree (right-handed twist). The alignment direction of the director at the front CNLC surface indicated by line A–A' (the front easy axis) is arranged to form an angle $\phi_1=-120°$ with respect to the x-axis. The alignment direction of the director at the rear CNLC surface indicated by line B–B' (the rear easy axis) is arranged to form an angle $\phi_2=120°$ with respect to the x-axis. Thus, the directors of the CNLC are rotated clockwise (right-handed twist) about the z-axis to an angle $\Phi=240°$ from the front to the rear CNLC surface. The optical transmission axis of the front polarizer indicated by line C–C' is arranged to form a desired angle $\phi=38°$ with respect to the x-axis. The angle $\alpha$ formed between the transmission axis of the front polarizer and the front easy axis is also shown in FIG. 10b. The desired value of angle $\alpha$ is 82°.

Figure 11A:
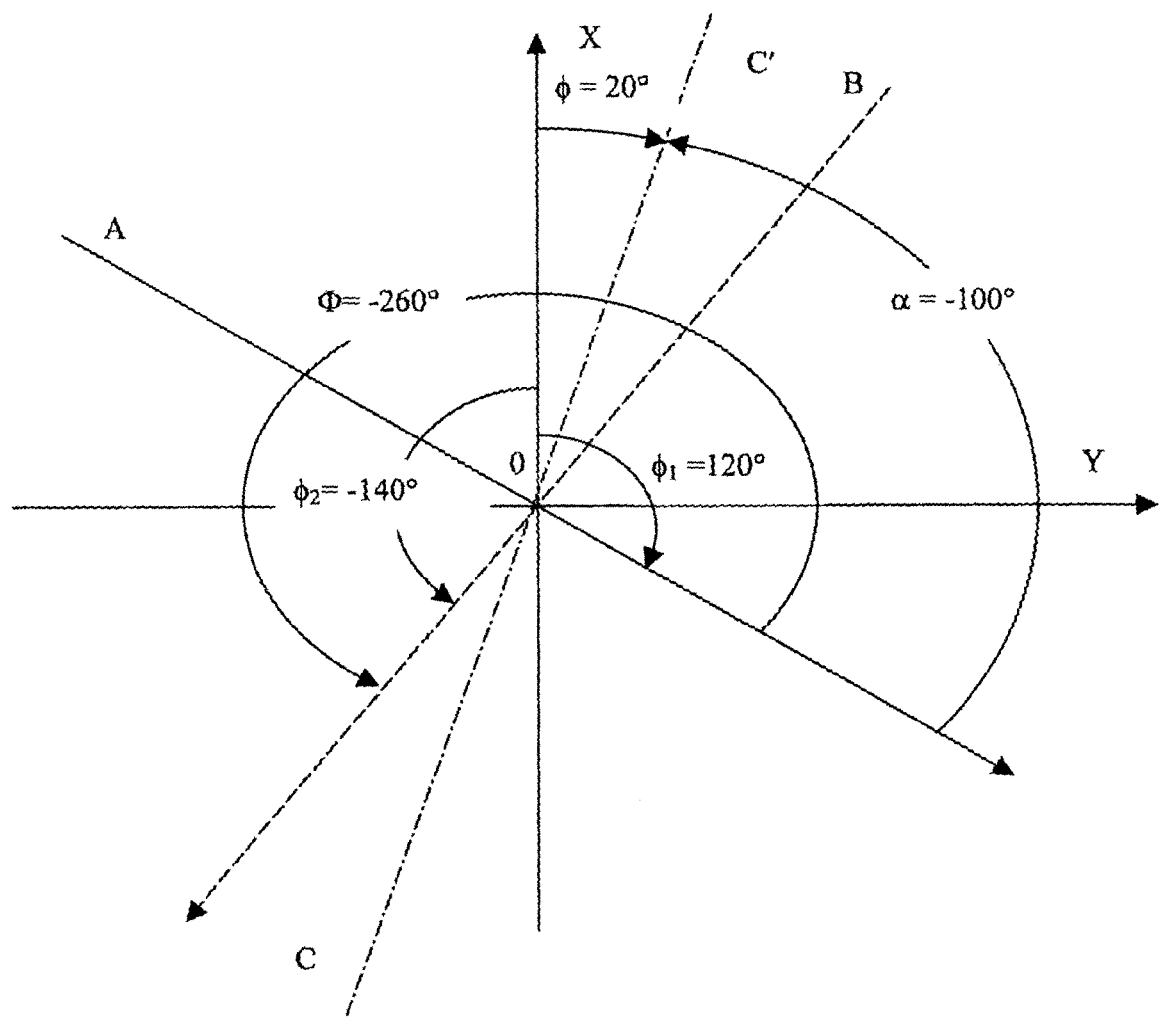
FIGS. 11a and 11b are schematics illustrating the orientation of the optical transmission axis of the front polarizer and the front and rear easy axes of the chiral nematic liquid crystal having a left-handed twist angle of −260° (FIG. 11a) and a right-handed twist angle of +260° (FIG. 11b).

FIG. 11a illustrates one embodiment of the invention in which the CNLC has a twist angle of −260 degree (left-handed twist). The alignment direction of the director at the front CNLC surface indicated by line A–A' (the front easy axis) is arranged to form an angle $\phi_1=120°$ with respect to the x-axis. The alignment direction of the director at the rear CNLC surface indicated by line B–B' (the rear easy axis) is arranged to form an angle $\phi_2=140°$ with respect to the x-axis. Thus, the directors of the CNLC are rotated counterclockwise (left handed twist) about the z-axis to an angle $\Phi=-260°$ from the front to the rear CNLC surface. The optical transmission axis of the front polarizer indicated by line C–C' is arranged to form a desired angle $\phi=20°$ with respect to the x-axis. The angle $\alpha$ formed between the transmission axis of the front polarizer and the front easy axis is also shown in FIG. 11a. The desired value of angle $\alpha$ is $-100°$.

Figure 11B:
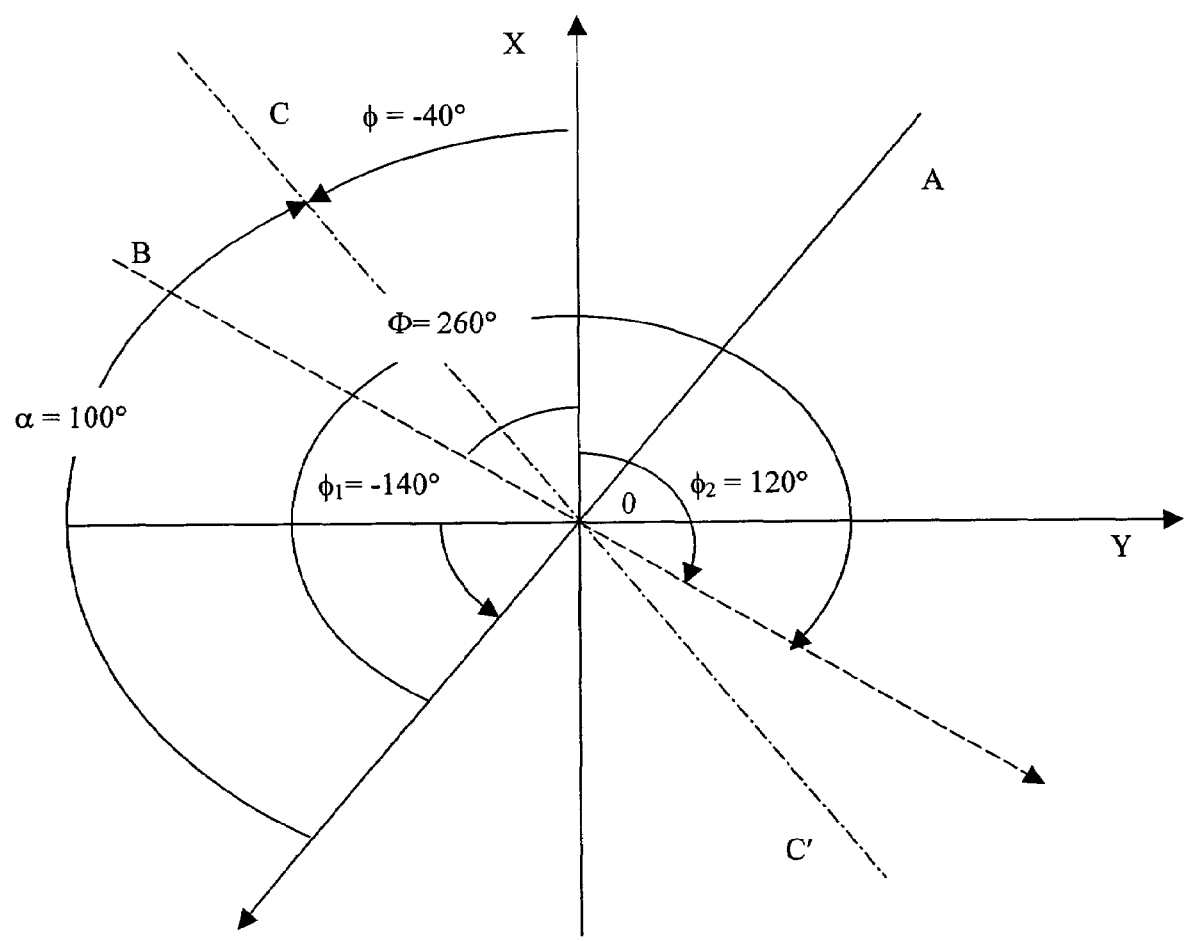

FIG. 11b illustrates one embodiment of the invention in which the CNLC has a twist angle of 260 degree (right-handed twist). The alignment direction of the director at the front CNLC surface indicated by line A–A' (the front easy axis) is arranged to form an angle $\phi_1=-160°$ with respect to the x-axis. The alignment direction of the director at the rear CNLC surface indicated by line B–B' (the rear easy axis) is arranged to form an angle $\phi_2=120°$ with respect to the x-axis. Thus, the directors of the chiral nematic liquid crystal are rotated clockwise (right-handed twist) about the z-axis to an angle $\Phi=260°$ from the front to the rear CNLC surface. The optical transmission axis of the front polarizer indicated by line C–C' is arranged to form a desired angle $\phi=-40°$ with respect to the x-axis. The angle $\alpha$ formed between the transmission axis of the front polarizer and the front easy axis is also shown in FIG. 11b. The desired value of angle $\alpha$ is 100°.

The desired values of the CNLC layer optical retardation and the orientation of transmission axis of the front polarizer with respect to the x-axis ($\phi$) and with respect to the front easy axis ($\alpha$) for different left- and right-handed twist angles of the CNLC director are presented in Table 1.

The desired orientation of the front polarizer may be more conveniently defined by angle $\alpha$ between the transmission axis of the front polarizer and the front easy axis. As Table 1 shows, if the left-handed twist is shifted to the right-handed twist, the desired orientation of the front polarizer (angle $\alpha$) simply changes the sign in front of the value.

TABLE 1

| Twist angle $\Phi$, deg | Transmission axis of the front polarizer with respect to the x-axis $\phi$, deg. | Transmission axis of the front polarizer with respect to the front easy axis (rubbing) $\alpha$, deg | Optical retardation ($\Delta$nd) of the CNLC layer, μm | Maximum Contrast ratio ($R_{ON}/R_{OFF}$) |
|---|---|---|---|---|
| −180 | 75 ± 3 | 75 − 120 = −45 | 0.64 | 7 |
| −200 | 65 ± 3 | 65 − 120 = −55 | 0.6 | 9 |
| −220 | 50 ± 3 | 50 − 120 = −70 | 0.59 | 9 |
| −240 | 38 ± 3 | 38 − 120 = −82 | 0.65 | 9 |
| −260 | 20 ± 3 | 20 − 120 = −100 | 0.9 | 4 |
| +180 | −15 ± 3 | −15 − (−60) = 45 | 0.64 | 7 |
| +200 | −25 ± 3 | −25 − (−80) = 55 | 0.6 | 9 |
| +220 | −31 ± 3 | −31 − (−100) = 69 | 0.59 | 9 |
| +240 | −38 ± 3 | −38 − (−120) = 82 | 0.65 | 9 |
| +260 | −40 ± 3 | −40 − (−140) = 100 | 0.9 | 4 |

Figure 12:
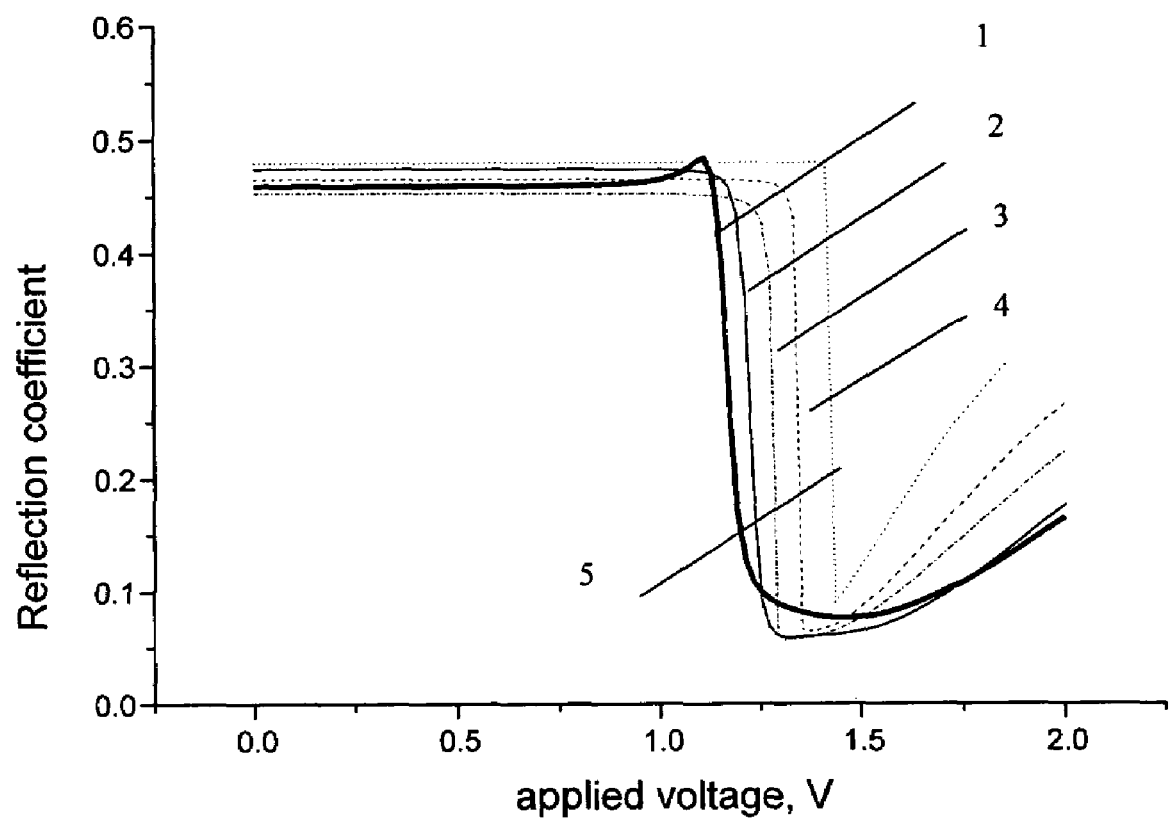
FIG. 12 is a chart illustrating the reflection coefficient versus applied voltage for the STN designs with different twist angles for 180°, 200°, 220°, 240° and 260° STN.

From the results summarized in Table 1, the best performance is achieved for twist angles in the range of 200–240 degrees, in which, the contrast ratio can be as high as 9 even without using any antireflective coating. Such high performance is contributed to the use of a single front polarizer, which results in a high reflection coefficient in OFF state, as shown in FIG. 12. In FIG. 12, the dependences of a reflection factor on applied voltage are shown for the STN designs with different twist angles (curve 1 for 180° STN; curve 2 for 200° STN; curve 3 for 220° STN; curve 4 for 240° STN; and curve 5 for 260° STN). The performance is sharply decreased if the twist angle achieves the value of 260°. The contrast also decreases if the twist angle is less than 200°. It is also important that the increase of the twist angle results in narrowing the voltage range corresponding to the BLACK (ON) state, as shown in FIG. 12. Taking all these into account, a twist angle in the range between 200 and 240° is desirable in design optimization.

The spectra of the reflection coefficient for OFF and ON-states and for different twist angles of the optimized STN designs are shown in FIGS. 13–17.

Figure 13:
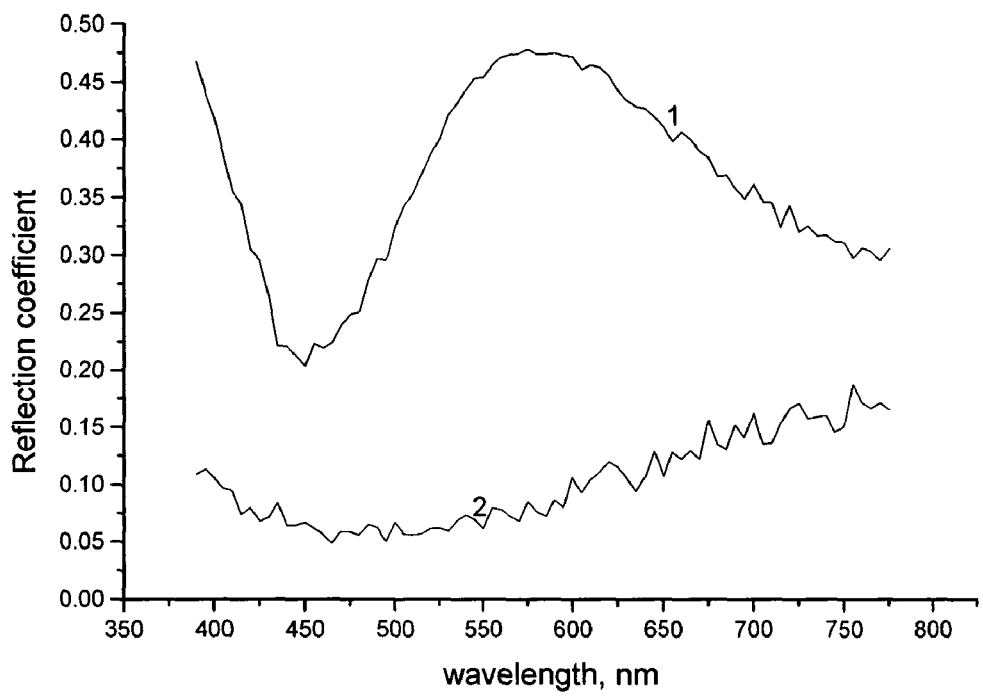
FIG. 13 shows spectra illustrating the reflection coefficient for 180° STN with a single front polarizer in OFF- and ON-states.

FIG. 13 is the spectra of the reflection coefficient for 180° STN with a single front polarizer in OFF- (curve 1) and ON- (curve 2) states. The twist angle is about −180°. The desired angle $\alpha$ between the front easy axis of the CNLC director and the transmission axis of the front polarizer is about 45°. The OFF-state color is yellow.

Figure 14:
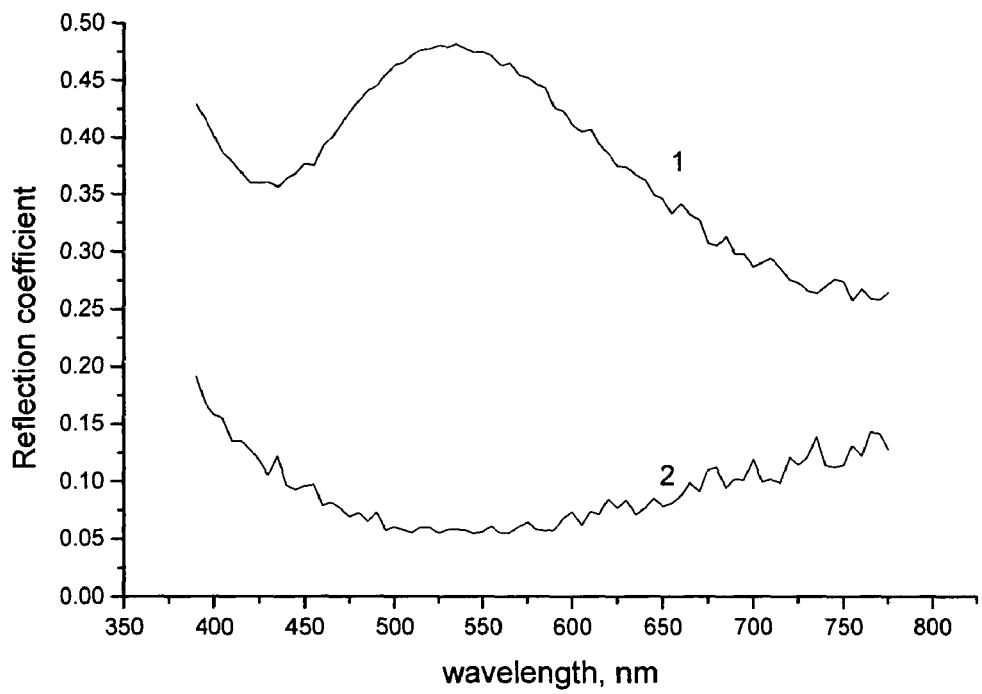
FIG. 14 shows spectra illustrating the reflection coefficient for 200° STN with a single front polarizer in OFF- and ON-states.

FIG. 14 is the spectra of the reflection coefficient for 200° STN with a single front polarizer in OFF- (curve 1) and ON- (curve 2) states. The twist angle is about −200°. The desired angle $\alpha$ between the front easy axis of the CNLC director and the transmission axis of the front polarizer is about −55°. The OFF-state color is bluish (close to white).

Figure 15:
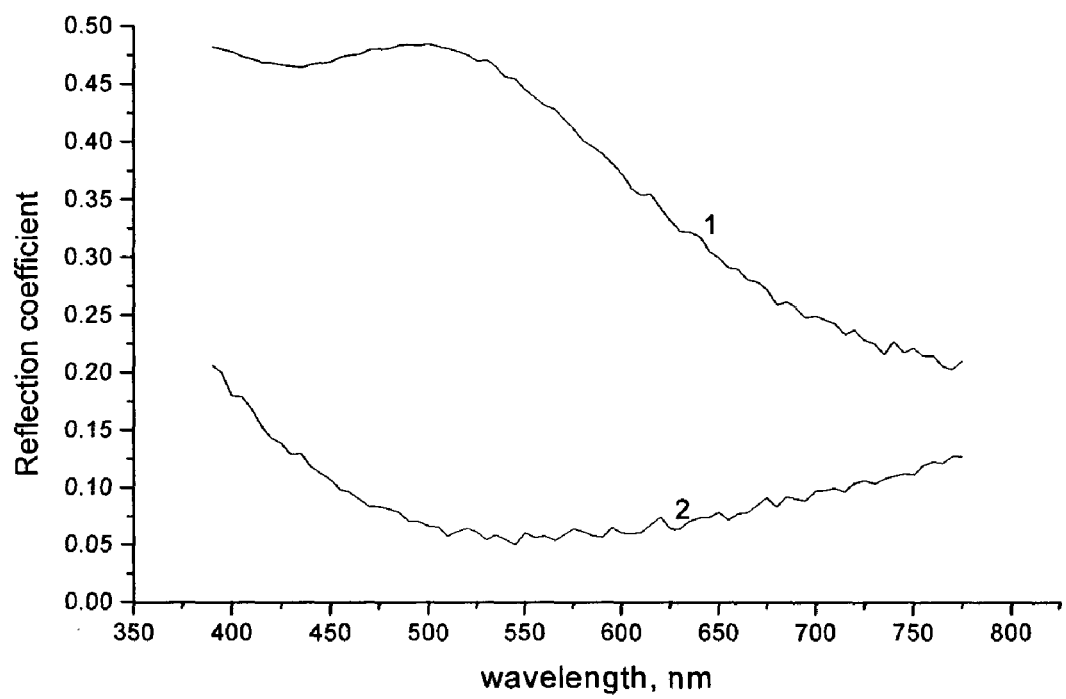
FIG. 15 shows spectra illustrating the reflection coefficient for 220° STN with a single front polarizer in OFF- and ON-states.

FIG. 15 is the spectra of the reflection coefficient for 220° STN with a single front polarizer in OFF- (curve 1) and ON- (curve 2) states. The twist angle is about −220°. The desired angle $\alpha$ between the front easy axis of the CNLC director and the transmission axis of the front polarizer is about −70°. The OFF-state color is bluish.

Figure 16:
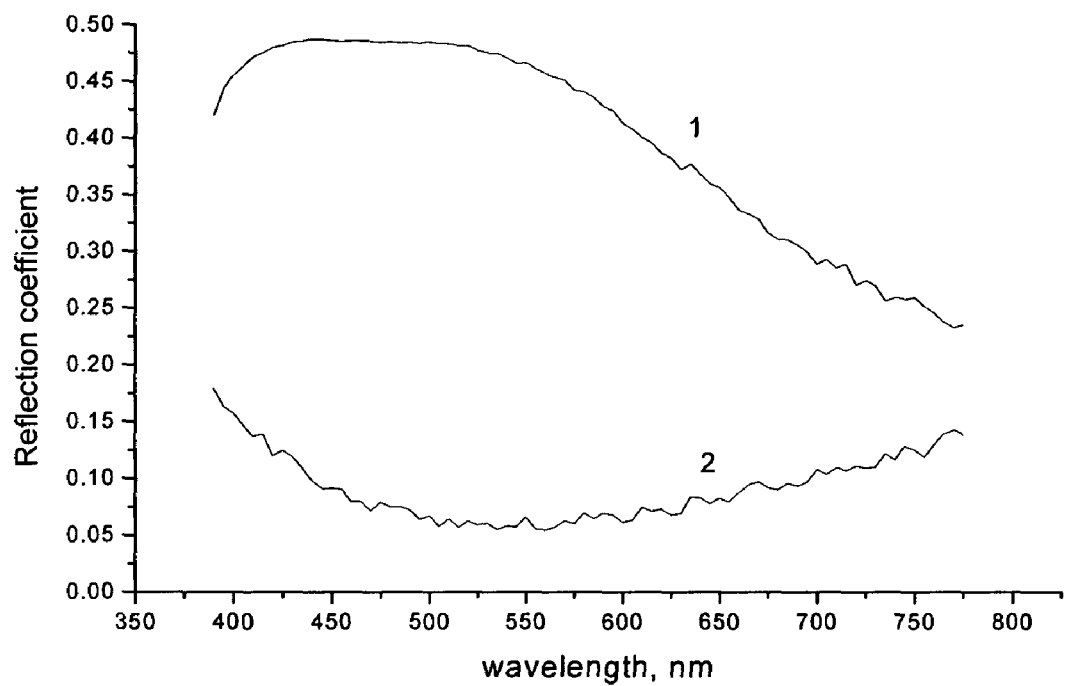
FIG. 16 shows spectra illustrating the reflection coefficient for 240° STN with a single front polarizer in OFF- and ON-states.

FIG. 16 is the spectra of the reflection coefficient for 240° STN with a single front polarizer in OFF- (curve 1) and ON- (curve 2) states. The twist angle is about −240°. The desired angle $\alpha$ between the front easy axis of the CNLC director and the transmission axis of the front polarizer is about −82°. The OFF-state color is bluish (close to white).

Figure 17:
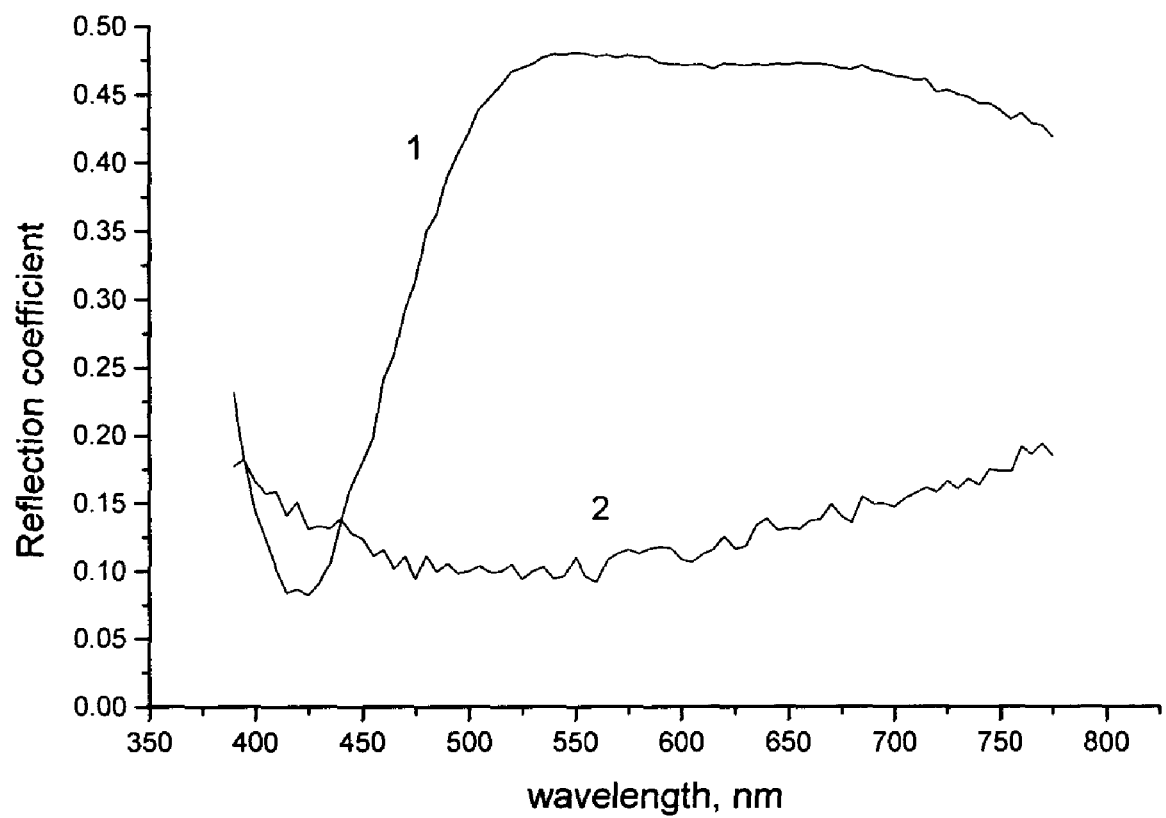
FIG. 17 shows spectra illustrating the reflection coefficient for 240° STN with a single front polarizer in OFF- and ON-states.

FIG. 17 is the spectra of the reflection coefficient for 260° STN with a single front polarizer in OFF- (curve 1) and ON- (curve 2) states. The twist angle is about −260°. The desired angle $\alpha$ between the front easy axis of the CNLC director and the transmission axis of the front polarizer is about −100°. The OFF-state color is yellow.

The above data show that the desirable performance is obtained in the cases of the twist angles ranging from 200° to 240°. For these twist angles, the appearance of the display in bright (OFF) state is slightly bluish but is still very close to "white" color if standard D65 light source is used. If the CNLC director twist angle is less than 200° or higher than 240°, the color of the "bright" state becomes yellow. Also the overall performance characterized by luminance ratio (weighted contrast ratio with account for human eye sensitivity) in OFF and ON-states decreases in the latter case. Thus, for single front polarizer designs, the desirable twist angle is in the range from approximately 200° to 240°.

The above data or results represent the basis for obtaining empirical (analytical) relations between the parameters of the display. For this purpose, obtained data were approximated by polynomials of the second degree (power) for the dependence of a angle on twist angle ($\Phi$) and polynomials of third degree (power) for the dependence of optical retardation of CNLC layer on the twist angle ($\Phi$). Resulting from the optimization using the described method, the desired values of coefficients of evocative polynomials, and also empirical (analytical) dependences have been obtained. For the value of twist angle $\Phi$ in the range of approximately from 180° to 260°, the values of angle $\alpha$ and retardation $\Delta$nd are defined by the following formulas:

$$\alpha(\Phi) = \text{sign}(\Phi) \cdot (47.0 - 0.4936 \cdot |\Phi| + 2.6786 \cdot 10^{-3} \cdot \Phi^2) \pm 5, \text{ deg, and}$$

$$\Delta nd(\Phi) = -11.674 + 0.1915.1 \cdot |\Phi| - 9.8393 \cdot 10^{-4} \cdot \Phi^2 + 1.6667 \cdot 10^{-6} \cdot |\Phi|^3 \pm 0.05, \mu m.$$

Figure 18:
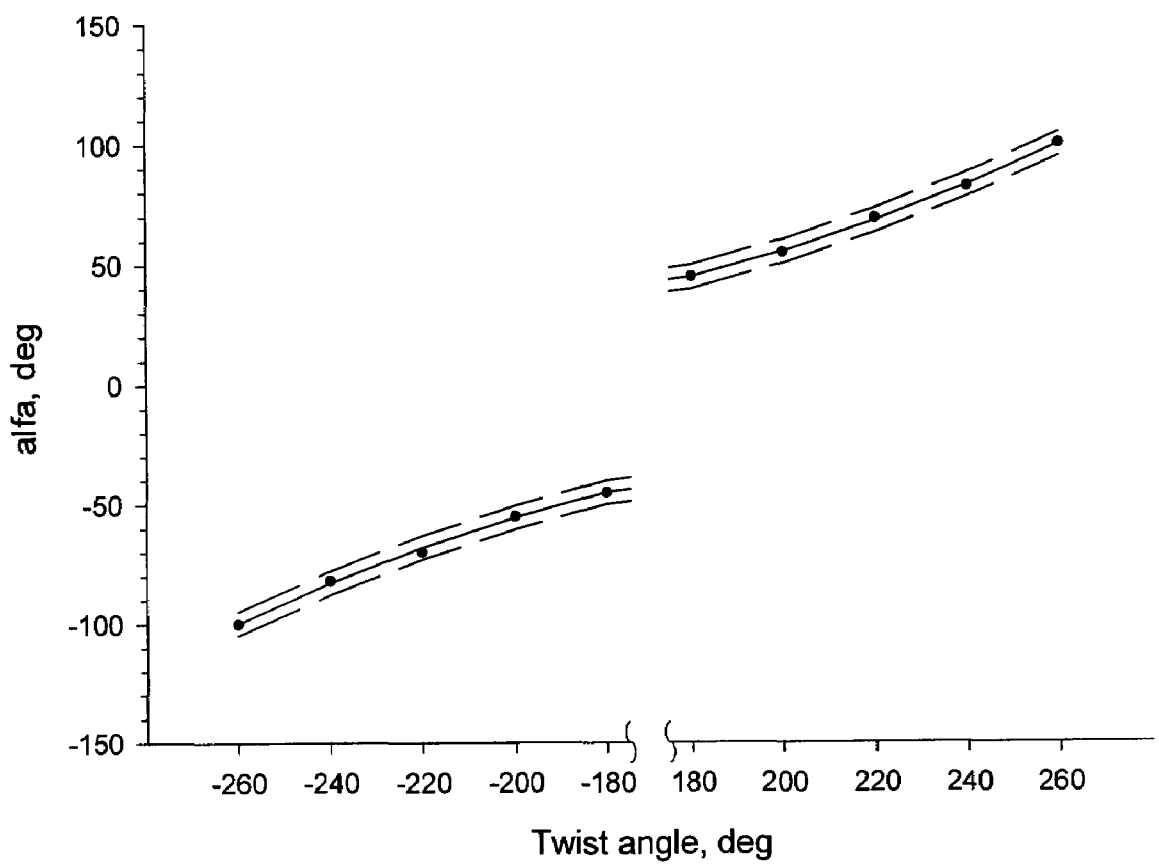
FIG. 18 is a chart illustrating the dependence of angle α of the transmission axis of the front polarizer with respect to the front easy axis on twist angle Φ.
Figure 19:
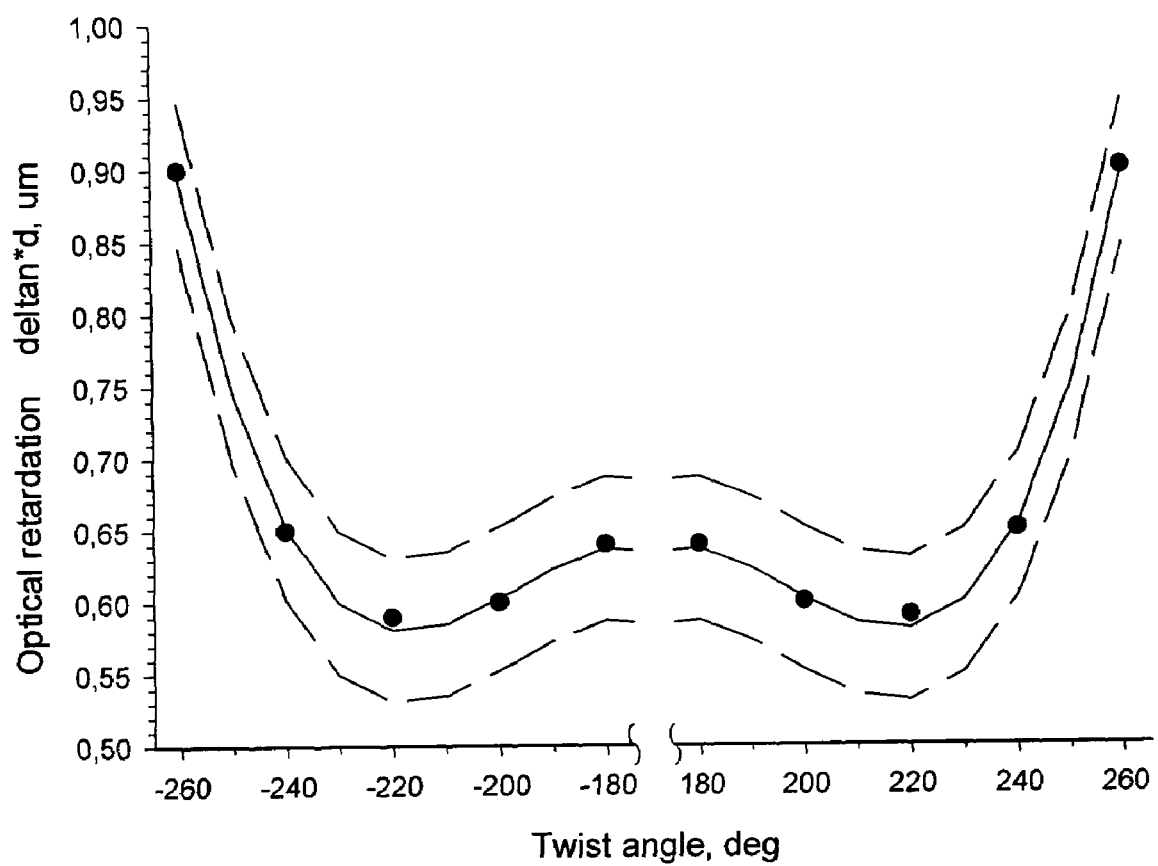
FIG. 19 is a chart illustrating the dependence of the optical retardation Δnd of the chiral nematic LC layer on twist angle Φ.

FIG. 18 illustrates the derived (obtained) dependence of the angle between the transmission axis of the front polarizer and the front easy axis on the twist angle $\Phi$. FIG. 19 illustrates the dependence of the optical retardation of the CNLC layer on the twist angle $\Phi$. The data from Table 1 are also marked on in FIGS. 17–18. The curve has small deviations from the data within the limit of errors of the theoretical calculations.

As the data presented herein indicate, there is a set of values of angle $\alpha$ at which the optical transmission axis of the front polarizer are desirably oriented. This angle practically does not depend on the type of CNLC materials, and in particular on the optical anisotropy $\Delta n$, since the necessary desire value of the product $\Delta nd$ can be obtained with the corresponding correction of the CNLC layer thickness (d). Thus, the present invention is not in any way limited to a specific material such as MLC-6806-000. The principal optical characteristics are defined by the optical retardation of a CNLC layer. The theoretical calculations are provided in terms of this optical retardation. The obtained theoretic results are applicable for any CNLC. The type of CNLC will influence ON/OFF-state voltage that is specified independently by the CNLC manufacturer (for instance Merck always specifies U10, U90).

Numerical investigations have also shown that the thickness of the polarizing layer does not affect the above desirable values of angle $\alpha$. At the same time, the contrast ratio changes periodically due to the interference effects with the increase of TCF polarizer thickness. The desirable front polarizer thickness depends on the refractive indices of the particular TCF material. Its typical value is in the range of approximately 0.4–0.6 µm. The desirable performance (contrast ratio and brightness) is defined by the properties of the TCF material. The material allows creation of the polarizers with a high performance close to the performance of the standard polarizers. The brightness of the design is characterized by absolute reflection coefficient higher than 40% and a contrast ratio close to 10.

An anisotropic thin crystal film (TCF) described in U.S. Pat. Nos. 5,739,296 and 6,049,428 and in the following publications: P. Lazarev, et al., "X-ray Diffraction by Large Area Organic Crystalline Nano-films" *Molecular Materials*, 14(4), 303–311 (2001), and Bobrov, Y. "Spectral properties of Thin Crystal Film Polarizers" *Molecular Materials*, 14(3), 191–203 (2001) may be used as the front polarizer. The characteristics of the optically anisotropic dichroic thin crystal film are small thickness, low temperature sensitivity, high anisotropy of refraction indexes, anisotropy of absorption coefficients, large value of dichroic ratio and simplicity of fabrication. The properties of the material utilized and the fabrication method of the crystalline film affect the molecular-crystalline structure of the thin crystal film. The TCF is formed via crystallization of liquid-crystalline phase of at least one organic material that forms lyotropic or (thermotropic) liquid crystal phase. The lyotropic or (thermotropic) liquid crystal phase is typically formed via deposition of the liquid crystal onto a substrate with the use of the alignment influence and subsequent drying. The organic material in the anisotropic thin crystal film is typically comprised of at least one organic compound. The chemical formula of the organic compound contains at least one ionogenic group which provides its solubility in polar solvents, and/or at least one non-ionogenic group which provides its solubility in non-polar solvents, and/or at least one anti-ion, which may or may not remain in the molecule structure after the preparation of the material.

An optically anisotropic dichroic thin crystal film comprises a multitude of supramolecular complexes (Jean-Marie Lehn, <<Supramolecular Chemistry. Concepts and Perspectives>>,—Weinheim; New York; Basel; Cambridge; Tokyo: VCH Verlagsgesellschaft mbH, 1995) of one or several organic materials. Moreover, the supramolecular complexes are aligned in a particular manner in order to provide polarization of the passing light.

The initial choice of the material to form an optically anisotropic dichroic thin crystal film is determined by the presence in the system of π-conjugate bonds in the aromatic conjugate cycles and the presence of groups such as amine, phenol, ketone, etc. which lay in the plane of molecules and constitute a part of the aromatic bond system. The molecules themselves or their fragments have a flat structure. For example, organic materials can be indanthrone (Vat Blue 4), or dibenzoimidazole 1,4,5,8-perelenetetracarboxilic acid (Vat Red 14), or dibenzoimidazole 4,9,10-perelenetetracarboxilic acid, or quinacridone (Pigment Violet 19) and others, the derivatives or mixtures of which form a stable lyotropic liquid crystal phase.

When such organic compound is dissolved in a suitable solvent, it forms a colloid system or lyotropic liquid crystal (LLC), wherein molecules are joined into supramolecular complexes which represent kinetic units of the system (described in more detail in WO 01/63346). The liquid crystal phase represents the preordered state of the system, from which a solid optically anisotropic dichroic thin crystal film is provided through the process of alignment of the supramolecules and subsequent removal of the solvent.

In a nematic liquid crystal display according to one embodiment of the present invention, the layer of optically anisotropic dichroic thin crystal film is processed by metal ions of two- and/or three-valence for the transfer of this material into an insoluble phase. In an alternative embodiment of the disclosed invention, molecules of at least one aromatic organic compound may contain heterocycles. In another embodiment, the layer of optically anisotropic dichroic thin crystal film is generated from a lyotropic liquid crystal on a basis of at least one dichroic dye.

In the obtained optically anisotropic dichroic thin crystal film, planes of molecules are substantially parallel to each other and the molecules form three-dimensional crystals in at least a part of the thin crystal film. By optimizing the fabrication procedure, a mono-crystalline optically anisotropic thin crystal film may be obtained. The optical axis in the thin crystal film is substantially perpendicular to the planes of molecules. Such thin crystal films possess high degree of anisotropy, and for at least one direction, high refraction index and/or absorption coefficient.

The optical anisotropy of the mentioned optically anisotropic dichroic thin crystal film is described by ellipsoids of the imaginary and real parts of the complex refraction index, characterizing angular dependence of the absorption coefficient and refraction index, respectively (the imaginary and real parts of the complex anisotropic refraction index). For the components of the imaginary ($K_j$) and real ($n_j$) parts of the complex refraction index of the optically anisotropic thin crystal films according to the invention, the following relationships are desirably simultaneously met:

$$K_1 \geq K_2 > K_3, \text{ and}$$

$$(n_1+n_2)/2 > n_3,$$

where $K_1$, $K_2$, $K_3$ and $n_1$, $n_2$, $n_3$ correspond to the main values of the imaginary and real parts of the anisotropic complex refraction index of the thin crystal film material respectively.

Components of the real and imaginary parts of the anisotropic complex refraction index, as well as the direction of the axes of the ellipsoid, may be experimentally determined via existing ellipsometric or spectrophotometric methods.

The desired anisotropy of the absorption coefficients ($K_1$, $K_2$, $K_3$) and refraction indexes ($n_1$, $n_2$, $n_3$), as well as the orientation of the principal axes, i.e. optical properties of the optically anisotropic dichroic thin crystal film in the multilayer structure, may be provided by a certain angular distribution of molecules in the polarizing film on the surface of the substrate.

It is also possible to mix colloid systems (in this case combined supramolecules will be formed in a solution) to obtain thin crystal films with intermediate optical properties. Absorption and refraction of the optically anisotropic dichroic thin crystal films obtained from mixtures of colloid systems may assume various values within the limits determined by the original components. Mixing various colloid systems to obtain combined supramolecules is possible due to coincidence of one of the dimensions of molecules (intermolecular spacing) of various organic compounds (3.4±0.3 Å).

The thickness of the optically anisotropic dichroic thin crystal film is controlled through the solid matter content in the solution. The process variable in fabrication of these optically anisotropic dichroic thin crystal films is the concentration of the solution, which can be conveniently controlled during fabrication.

The degree of crystallinity of the thin crystal film may be controlled through crystallography and/or optical methods.

Surfaces, which are coated with thin crystal films, may undergo additional processing to provide uniform wettability of the surface (to provide hydrophilicity to the surface). This processing may be mechanical processing, annealing, and/or mechano-chemical processing. Prior to application of the thin crystal film, aligned anisotropic structures may be formed on the surface of substrate via mechanical processing of the substrate surface to promote a higher degree of orderliness of molecules in the thin crystal film.

Figure 20:
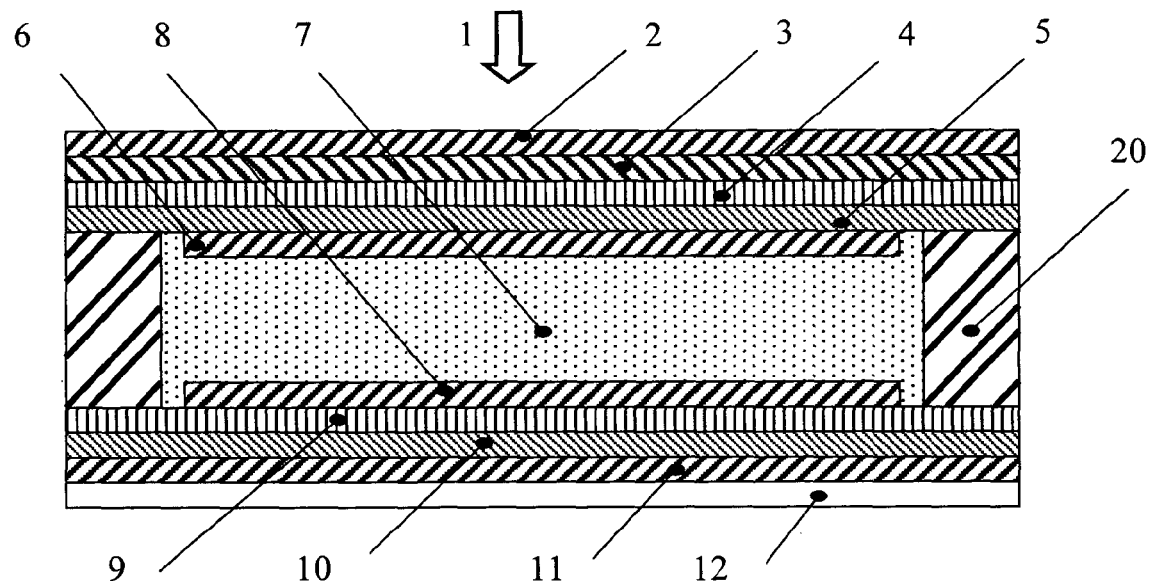
FIG. 20 is a schematic showing a normally white, supertwist nematic liquid crystal display in accordance with one embodiment of the present invention.

FIG. 20 presents one embodiment of the normally white, supertwist nematic liquid crystal display of reflective type with a single front polarizer according to the disclosed invention, which is lighted by a light source (1). The display comprises a front glass plate 2, a front optically transparent electrode 3, a front optically transparent protective layer 4, a front polarizer 5, a front alignment layer 6, a layer of CNLC 7, a rear alignment layer 8, a rear optically transparent protective layer 9, rear optically transparent electrode 10, a rear glass plate 11, a reflector 12, and an insulation spacer 20. Optically transparent electrodes 3 and 10 may be made of ITO. Protective layers 4 and 9 may be made, for example, out of silicon dioxide. Alignment layers 6 and 8 may be made out of polyimide, for example, polyimide SE3210 from Nissan. The reflector 12 may be fabricated via vacuum evaporation of metal, for example, aluminum. The external surface of the front glass plate 2 may be coated with an external polarizer and/or anti-reflecting layer and/or a diffuse scattering layer. The normally white, supertwist nematic liquid crystal display of reflective type according to the present invention may additionally contain layers of internal anti-reflecting filters. The front polarizer and CNLC layers are chosen as described herein.

Figure 21:
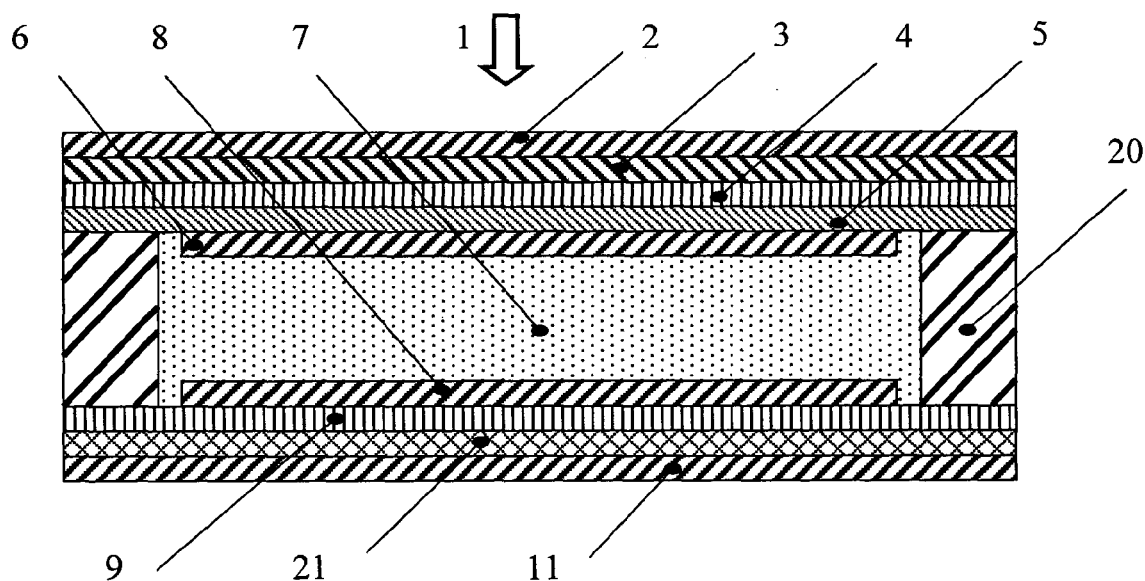
FIG. 21 is a schematic showing a normally white, supertwist nematic liquid crystal display in accordance with another embodiment of the present invention.

FIG. 21 presents another embodiment of the normally white, supertwist nematic liquid crystal display of reflective type with a single polarizer according to the disclosed invention, which is lighted by a light source (1). The display comprises a front glass plate 2, a front optically transparent electrode 3, a front optically transparent protective layer 4, a front polarizer 5, a front alignment layer 6, and a layer of CNLC 7, a rear alignment layer 8, a rear optically transparent protective layer 9, an optically non-transparent rear electrode 21 that also serves as a reflector with reflection coefficient no less than 95%, a rear glass plate 11, and an insulation spacer 20. The front optically transparent electrode 3 may be made of ITO. A layer of metal may represent the rear electrode 21, i.e., this electrode may perform functions of both an electrode and a reflector. The reflecting layer 21 may be fabricated via vacuum evaporation of a metal, for example, aluminum. Protective layers 4 and 9 may be made, for example, out of silicon dioxide. Alignment layers 6 and 8 may be made out of polyimide, for example, polyimide SE3210 from Nissan.

The external surface of the front glass plate 2 may be coated with the external polarizer and/or anti-reflecting layer and/or a diffuse scattering layer. The normally white, supertwist nematic liquid crystal display of reflective type according to the present invention can additionally contain layers of internal anti-reflecting filters.

In the embodiment illustrated in FIG. 20, the normally white, supertwist liquid crystal display has the following layer parameters: glass plate with thickness 0.7 mm (refraction index n=1.5); layer of ITO with thickness 0.03 μm (refraction index n=1.85); layer of optically transparent silicon dioxide with thickness 75 nm (refraction index n=1.57); layer of front polarizer, fabricated out of optically anisotropic dichroic thin crystal film, the angle of optical transmission axis of which is 35° with respect to the x-axis, and which is d=0.521 μm thick; layer of polyimide SE3210 Nissan with thickness 60 nm (refraction index n=1.68); layer of CNLC characterized by Δnd=0.7 μm and left-handed twist of the director with the twist angle of 240°, from +120° (at the front surface) to −120° (at the rear surface); layer of polyimide SE3210 Nissan with thickness 60 nm (refraction index n=1.68); layer of optically transparent silicon dioxide with thickness 75 nm (refraction index n=1.57); layer of ITO with thickness of 0.03 μm (refraction index n=1.85); glass plate with thickness of 0.7 mm (refraction index n=1.5); and mirror 95%.

The normally white supertwist liquid crystal display of the present invention improves the light transmission, simplifies the display design by eliminating of the retarder layer and utilizing of a single front polarizer, enhances the contrast ratio and multiplexing ability, increases the viewing angle, maximizes the achromaticity of the display, and reduces the display thickness and manufacturing costs.

As described above, a normally white supertwist liquid crystal display has been described. The foregoing descriptions of specific embodiments of the invention have been presented for the purpose of illustration and description. They are not intended to be exhaustive or to limit the invention to the precise forms disclosed, and obviously many modifications, embodiments, and variations are possible in light of the above teaching. It is intended that the scope of the invention be defined by the claims appended hereto and their equivalents.

The invention claimed is:

1. A normally white supertwist nematic liquid crystal display comprising:
    a reflector,
    a layer of chiral nematic liquid crystal having a front aligning surface facing a light source and a rear aligning surface facing the reflector, said nematic liquid crystal having an optical retardation (Δnd) of the layer and a distribution of directors, wherein said chiral nematic liquid crystal has a twist angle (Φ) between an alignment direction of a director at the front aligning surface and an alignment direction of a director at the rear aligning surface; and
    a front polarizer disposed between the layer of the chiral nematic liquid crystal and the light source, said front polarizer has a transmission axis forming an angle (α) with the alignment direction of the director at the front aligning surface of the chiral nematic liquid crystal layer;
    wherein the optical retardation (Δnd) and the angle (α) are defined by the following formulas:

$$\alpha(\Phi)=\text{sign}(\Phi)\cdot(47.0-0.4936\ |\Phi|+2.6786\times10^{-3}\cdot\Phi^2)\pm5,\text{ deg, and}$$

$$\Delta nd(\Phi)=-11.674+0.1915\cdot|\Phi|-9.8393\times10^{-4}\cdot\Phi^2+1.6667\times10^{-6}\cdot|\Phi|^3\pm0.05,\ \mu\text{m; and}$$

wherein the front polarizer is made out of an optically anisotropic dichroic thin crystal film material which comprises aromatic rings and has an intermolecular spacing of 3.4±0.3 Å in the direction of one of optical axes.

2. The liquid crystal display according to claim 1, wherein the twist angle (Φ) is in the range of approximately 180 to 260 degree.

3. The liquid crystal display according to claim 1, wherein the chiral nematic liquid crystal is further characterized by a helix natural pitch (P) having a value of approximately 360° d/Φ, wherein (d) is a thickness of the liquid crystal layer.

4. The liquid crystal display according to claim 1, wherein the chiral nematic liquid crystal director at the front surface coincides with a pretilt angle.

5. The liquid crystal display according to claim 1, wherein the front polarizer has a thickness that is sufficient to provide an interference extremum and a maximum contrast ratio in a spectral range corresponding to the maximum sensitivity of a human eye.

6. The liquid crystal display according to claim 1, wherein the optically anisotropic dichroic thin crystal film comprises metal ions of two- and/or three-valence.

7. The liquid crystal display according to claim 1, wherein the thin crystal film material comprises heterocycles.

8. The liquid crystal display according to claim 1, wherein the optically anisotropic dichroic thin crystal film is made of lyotropic liquid crystal based on at least one dichroic dye.

9. The liquid crystal display according to claim 1, wherein the optically anisotropic dichroic thin crystal film material is characterized by imaginary ($K_1$, $K_2$, $K_3$) and real ($n_1$, $n_2$, $n_3$) components of complex refraction index, said components satisfy the following relationships:

$$K_1 \geq K_2 > K_3, \text{ and}$$

$$(n_1+n_2)/2 > n_3.$$

* * * * *